US012563543B2

(12) United States Patent
Farag et al.

(10) Patent No.: US 12,563,543 B2
(45) Date of Patent: Feb. 24, 2026

(54) METHOD AND APPARATUS FOR TIMING OF CROSS CARRIER BEAM INDICATIONS

(71) Applicant: Samsung Electronics Co., Ltd., Suwon-si (KR)

(72) Inventors: Emad N. Farag, Flanders, NJ (US); Eko Onggosanusi, Coppell, TX (US); Dalin Zhu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 562 days.

(21) Appl. No.: 18/065,584

(22) Filed: Dec. 13, 2022

(65) Prior Publication Data

US 2023/0209529 A1 Jun. 29, 2023

Related U.S. Application Data

(60) Provisional application No. 63/314,905, filed on Feb. 28, 2022, provisional application No. 63/294,819, (Continued)

(51) Int. Cl.
*H04W 72/12* (2023.01)
*H04L 1/1812* (2023.01)
*H04W 72/23* (2023.01)

(52) U.S. Cl.
CPC ........... *H04W 72/12* (2013.01); *H04L 1/1812* (2013.01); *H04W 72/23* (2023.01)

(58) Field of Classification Search
CPC ...... H04W 72/12; H04W 72/23; H04L 1/1812
See application file for complete search history.

(56) References Cited

U.S. PATENT DOCUMENTS

2013/0022008 A1* 1/2013 Berggren .............. H04W 24/10
370/329
2020/0351794 A1* 11/2020 Xu ..................... H04B 7/06952
2021/0259001 A1 8/2021 Park et al.
2022/0061080 A1* 2/2022 Takeda .................. H04L 5/0044
2022/0217695 A1* 7/2022 Liou .................. H04B 7/06952
(Continued)

FOREIGN PATENT DOCUMENTS

WO 2021201533 A1 10/2021

OTHER PUBLICATIONS

"5G; NR; Physical channels and modulation (3GPP TS 38.211 version 16.7.0 Release 16)", ETSI TS 138 211 V16.7.0, Oct. 2021, 138 pages.
(Continued)

*Primary Examiner* — Jael M Ulysse

(57) ABSTRACT

Apparatuses and methods for timing control for a cross carrier beam indication in a wireless communication system. A method of operating a user equipment (UE) includes receiving configuration information for a list of transmission configuration indicator (TCI) states; receiving a configuration information for a list of TCI state code points; receiving configuration information for cross carrier scheduling; and receiving a downlink control information (DCI) format including (i) a carrier indicator field associated with the configuration information for cross carrier scheduling and (ii) a transmission configuration indication field indicating a TCI state code point from the list of TCI state code points. The method further includes applying the indicated TCI state code point to a carrier indicated by the carrier indicator field and receiving or transmitting downlink (DL) channels or uplink (UL) channels, respectively, based on the quasi-co-location properties or spatial properties corresponding to the indicated TCI state code point.

14 Claims, 21 Drawing Sheets

Related U.S. Application Data filed on Dec. 29, 2021, provisional application No. 63/294,832, filed on Dec. 29, 2021.

(56) References Cited

U.S. PATENT DOCUMENTS

| | | | | |
|---|---|---|---|---|
| 2022/0338235 A1* | 10/2022 | Bagheri | .................. | H04L 5/0094 |
| 2022/0394548 A1* | 12/2022 | Huang | .................. | H04W 72/23 |
| 2022/0408371 A1* | 12/2022 | Matsumura | ......... | H04W 52/242 |
| 2023/0022763 A1* | 1/2023 | Kim | ........................ | H04B 7/024 |
| 2023/0128435 A1* | 4/2023 | Matsumura | ....... | H04W 72/1273 |
| | | | | 370/329 |
| 2023/0136113 A1* | 5/2023 | Guo | ...................... | H04L 5/0094 |
| | | | | 370/329 |
| 2023/0209543 A1* | 6/2023 | Park | .................... | H04W 72/044 |
| | | | | 370/329 |
| 2023/0217458 A1 | 7/2023 | Bang et al. | | |
| 2023/0269041 A1* | 8/2023 | Rong | ................... | H04B 7/0695 |
| | | | | 370/329 |
| 2023/0345505 A1* | 10/2023 | Guo | ...................... | H04L 5/0053 |
| 2024/0163891 A1* | 5/2024 | Park | ........................ | H04B 7/088 |
| 2024/0397523 A1* | 11/2024 | Park | ................... | H04B 7/06966 |

OTHER PUBLICATIONS

"5G; NR; Multiplexing and channel coding (3GPP TS 38.212 version 16.7.0 Release 16)", ETSI TS 138 212 V16.7.0, Oct. 2021, 157 pages.

"5G; NR; Physical layer procedures for control (3GPP TS 38.213 version 16.7.0 Release 16)", ETSI TS 138 213 V16.7.0, Oct. 2021, 191 pages.

"5G; NR; Physical layer procedures for data (3GPP TS 38.214 version 16.7.0 Release 16)", ETSI TS 138 214 V16.7.0, Oct. 2021, 176 pages.

"5G; NR; Medium Access Control (MAC) protocol specification (3GPP TS 38.321 version 16.6.0 Release 16)", ETSI TS 138 321 V16.6.0, Oct. 2021, 160 pages.

"5G; NR; Radio Resource Control (RRC); Protocol specification (3GPP TS 38.331 version 16.6.0 Release 16)", ETSI TS 138 331 V16.6.0, Oct. 2021, 948 pages.

International Search Report and Written Opinion issued Mar. 30, 2023 regarding International Application No. PCT/KR2022/021139, 8 pages.

Samsung, "Multi-beam enhancements", 3GPP TSG RAN WG1 #103-e, R1-2008148, Nov. 2020, 20 pages.

Asustek, "Interoperation between cross-carrier scheduling and multiple TRPs", 3GPP TSG RAN WG1 #105-e, R1-2105842, May 2021, 4 pages.

Vivo, "Further discussion on multi beam enhancement", 3GPP TSG RAN WG1 #106-e, R1-2106571, Aug. 2021, 30 pages.

Samsung, "Multi-beam enhancements", 3GPP TSG RAN WG1 #106-e, R1-2106865, Aug. 2021, 24 pages.

Extended European Search Report issued Nov. 18, 2024 regarding Application No. 22916619.4, 11 pages.

MediaTek Inc., "Enhancement on multi-beam operation", 3GPP TSG RAN WG1 #104-e, R1-2100588, Jan. 2021, 27 pages.

* cited by examiner

Figures 8, 9, 10:
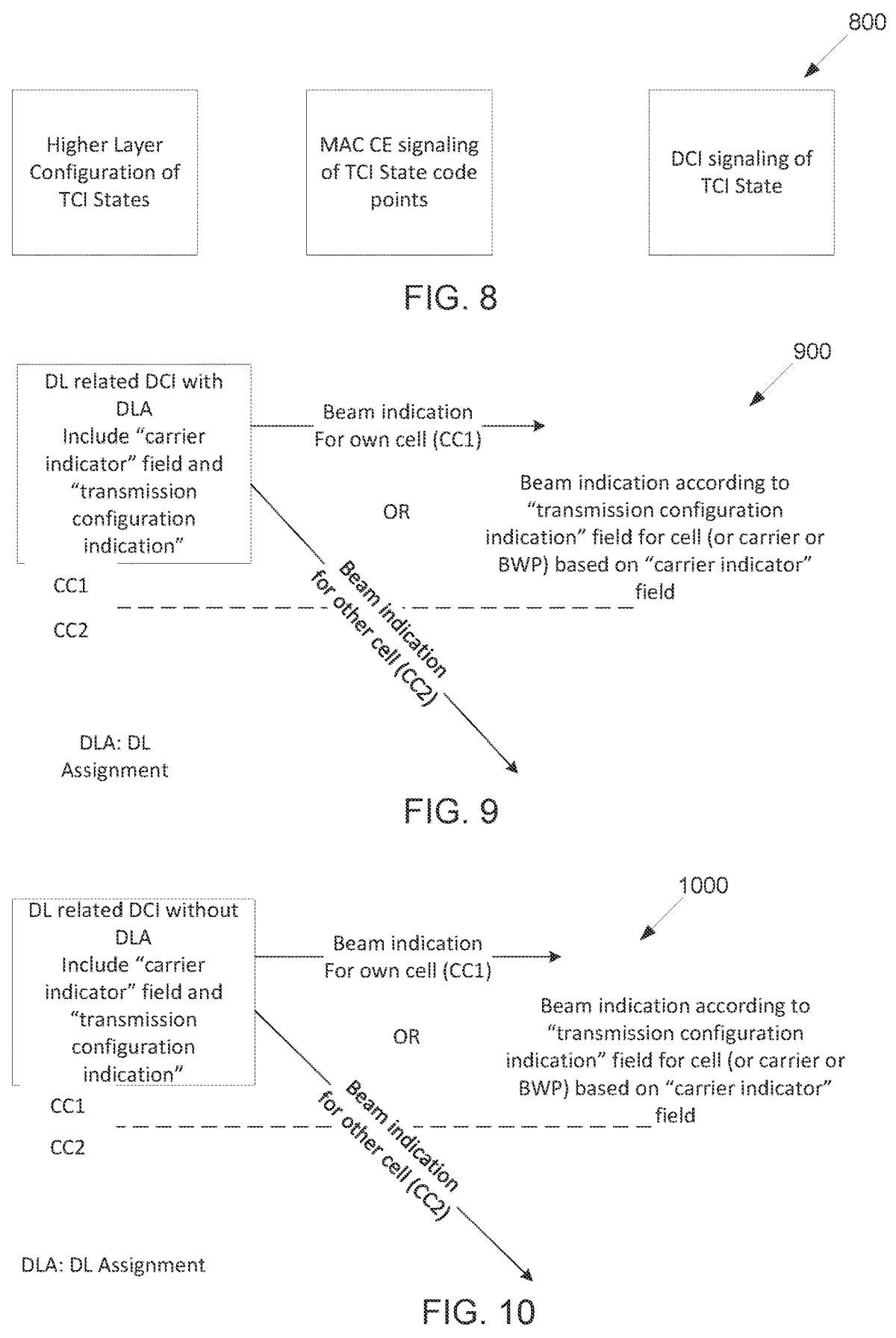

800

| Higher Layer Configuration of TCI States | MAC CE signaling of TCI State code points | DCI signaling of TCI State |

DL related DCI with DLA
Include "carrier indicator" field and "transmission configuration indication"

Beam indication For own cell (CC1)

OR

Beam indication for other cell (CC2)

Beam indication according to "transmission configuration indication" field for cell (or carrier or BWP) based on "carrier indicator" field

CC1

CC2

DLA: DL Assignment

DL related DCI without DLA
Include "carrier indicator" field and "transmission configuration indication"

Beam indication For own cell (CC1)

OR

Beam indication for other cell (CC2)

Beam indication according to "transmission configuration indication" field for cell (or carrier or BWP) based on "carrier indicator" field

CC1

CC2

DLA: DL Assignment

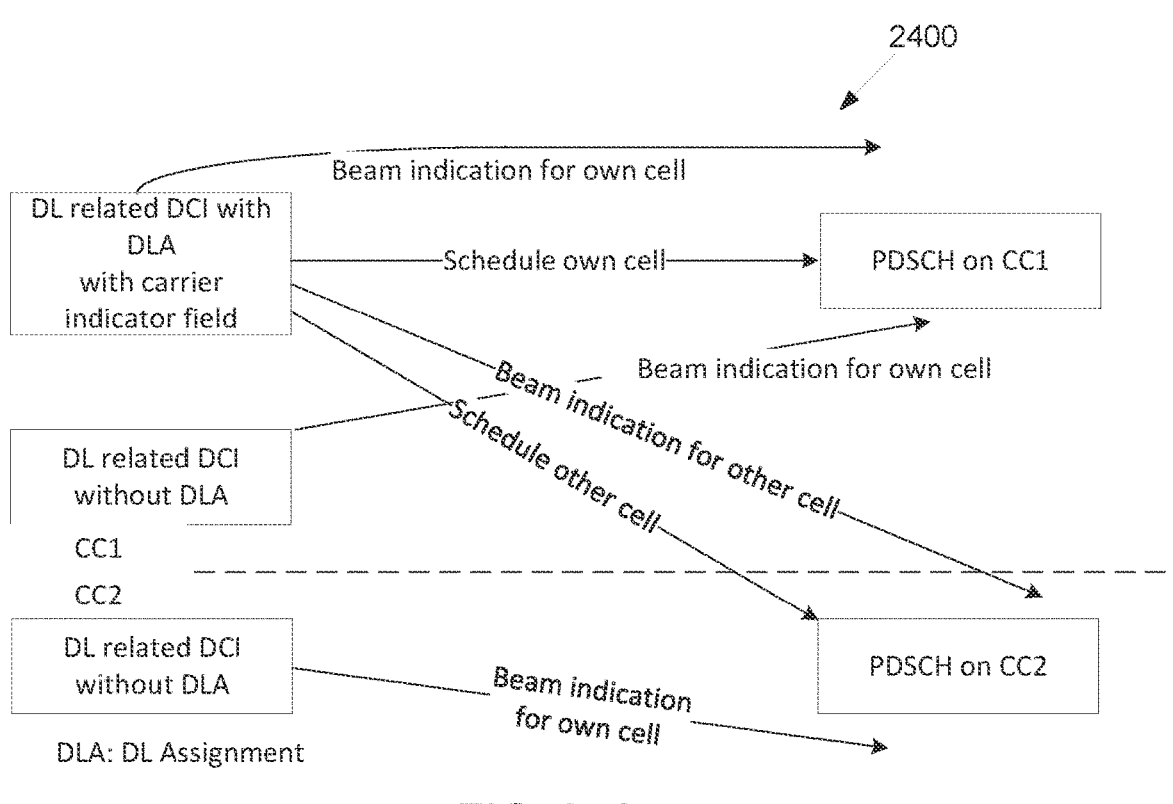

DL related DCI with
DLA
with carrier
indicator field

Beam indication for own cell

Schedule own cell

PDSCH on CC1

Beam indication for own cell

DL related DCI
without DLA

Beam indication for other cell

Schedule other cell

CC1

CC2

DL related DCI
without DLA

Beam indication
for own cell

PDSCH on CC2

DLA: DL Assignment

DL related DCI with
DLA
with carrier indicator
field

Schedule and beam
Indication for own cell

PDSCH on CC1

Beam indication for own cell

DL related DCI
without DLA

Schedule and beam
Indication for other cell

CC1

CC2

DL related DCI
without DLA

Beam indication
for own cell

PDSCH on CC2

DLA: DL Assignment

FIG. 24B

METHOD AND APPARATUS FOR TIMING OF CROSS CARRIER BEAM INDICATIONS

CROSS-REFERENCE TO RELATED APPLICATIONS AND CLAIM OF PRIORITY

The present application claims priority to:

U.S. Provisional Patent Application No. 63/294,819, filed on Dec. 29, 2021;

U.S. Provisional Patent Application No. 63/294,832, filed on Dec. 29, 2021; and

U.S. Provisional Patent Application No. 63/314,905, filed on Feb. 28, 2022. The contents of the above-identified patent documents are incorporated herein by reference.

TECHNICAL FIELD

The present disclosure relates generally to wireless communication systems and, more specifically, the present disclosure relates to a timing control for a cross carrier beam indication in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to timing control for a cross carrier beam indication in a wireless communication system.

In one embodiment, a user equipment (UE) is provided. The UE includes a transceiver configured to receive configuration information for a list of transmission configuration indicator (TCI) states, receive configuration information for a list of TCI state code points, receive configuration information for cross carrier scheduling, and receive a downlink control information (DCI) format including (i) a carrier indicator field associated with the configuration information for cross carrier scheduling and (ii) a transmission configuration indication field indicating a TCI state code point from the list of TCI state code points. The UE further includes a processor operably coupled to the transceiver that is configured to apply the indicated TCI state code point to a carrier indicated by the carrier indicator field. The transceiver is further configured to receive or transmit downlink (DL) channels or uplink (UL) channels, respectively, based on quasi-co-location properties or spatial properties corresponding to the indicated TCI state code point.

In another embodiment, a base station (BS) is provided. The BS includes a transceiver configured to transmit configuration information for a list of TCI states, transmit configuration information for a list of TCI state code points, transmit configuration information for cross carrier scheduling, and transmit a DCI format including (i) a carrier indicator field associated with the configuration information for cross carrier scheduling and (ii) a transmission configuration indication field indicating a TCI state code point from the list of TCI state code points. The BS further includes a processor operably coupled to the transceiver that is configured to apply the indicated TCI state code point to a carrier indicated by the carrier indicator field. The transceiver is further configured to transmit or receive DL channels or UL channels, respectively, based on the quasi-co-location properties or spatial properties corresponding to the indicated TCI state code point.

In yet another embodiment, a method of operating a user equipment (UE) is provided. The method includes receiving configuration information for a list of TCI states; receiving a configuration information for a list of TCI state code points; receiving configuration information for cross carrier scheduling; and receiving a DCI format including (i) a carrier indicator field associated with the configuration information for cross carrier scheduling and (ii) a transmission configuration indication field indicating a TCI state code point from the list of TCI state code points. The method further includes applying the indicated TCI state code point to a carrier indicated by the carrier indicator field and receiving or transmitting DL channels or UL channels, respectively, based on the quasi-co-location properties or spatial properties corresponding to the indicated TCI state code point.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of UE configuration through a higher layer RRC signaling according to embodiments of the present disclosure;

FIG. 9 illustrates an example of carrier indication according to embodiments of the present disclosure;

FIG. 10 illustrates another example of carrier indication according to embodiments of the present disclosure;

FIG. 24A illustrates yet an example of beam indication provided by a DL related DCI format according to embodiments of the present disclosure;

FIG. 24B illustrates yet another example of beam indication provided by a DL related DCI format according to embodiments of the present disclosure;

DETAILED DESCRIPTION

FIG. 1 through FIG. 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.7.0, "NR; Physical channels and modulation"; 3GPP TS 38.212 v16.7.0, "NR; Multiplexing and Channel coding"; 3GPP TS 38.213 v16.7.0, "NR; Physical Layer Procedures for Control"; 3GPP TS 38.214 v16.7.0, "NR; Physical Layer Procedures for Data"; 3GPP TS 38.321 v16.6.0, "NR; Medium Access Control (MAC) protocol specification"; and 3GPP TS 38.331 v16.6.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
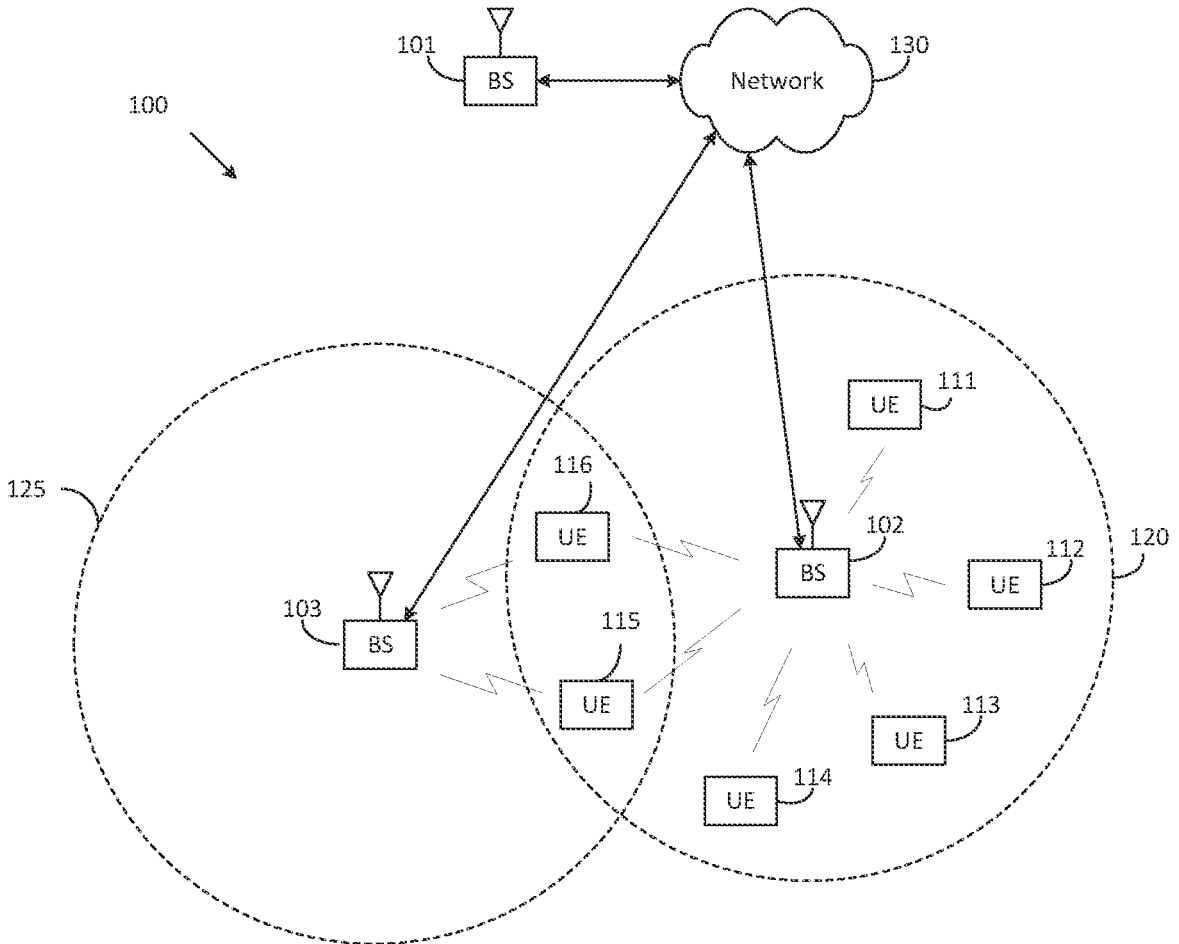
FIG. 1 illustrates an example of wireless network according to embodiments of the present disclosure.
Figure 2:
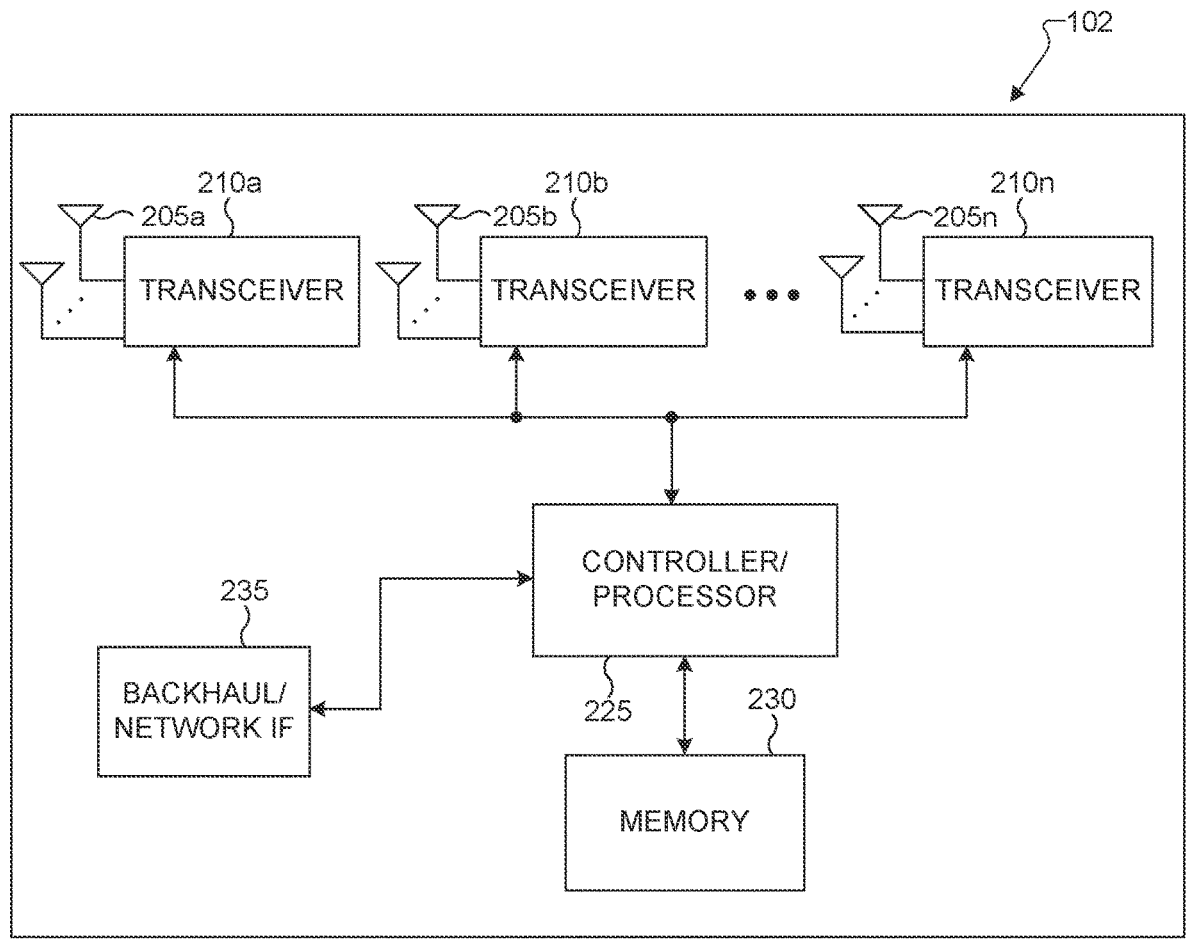
FIG. 2 illustrates an example of gNB according to embodiments of the present disclosure.
Figure 3:
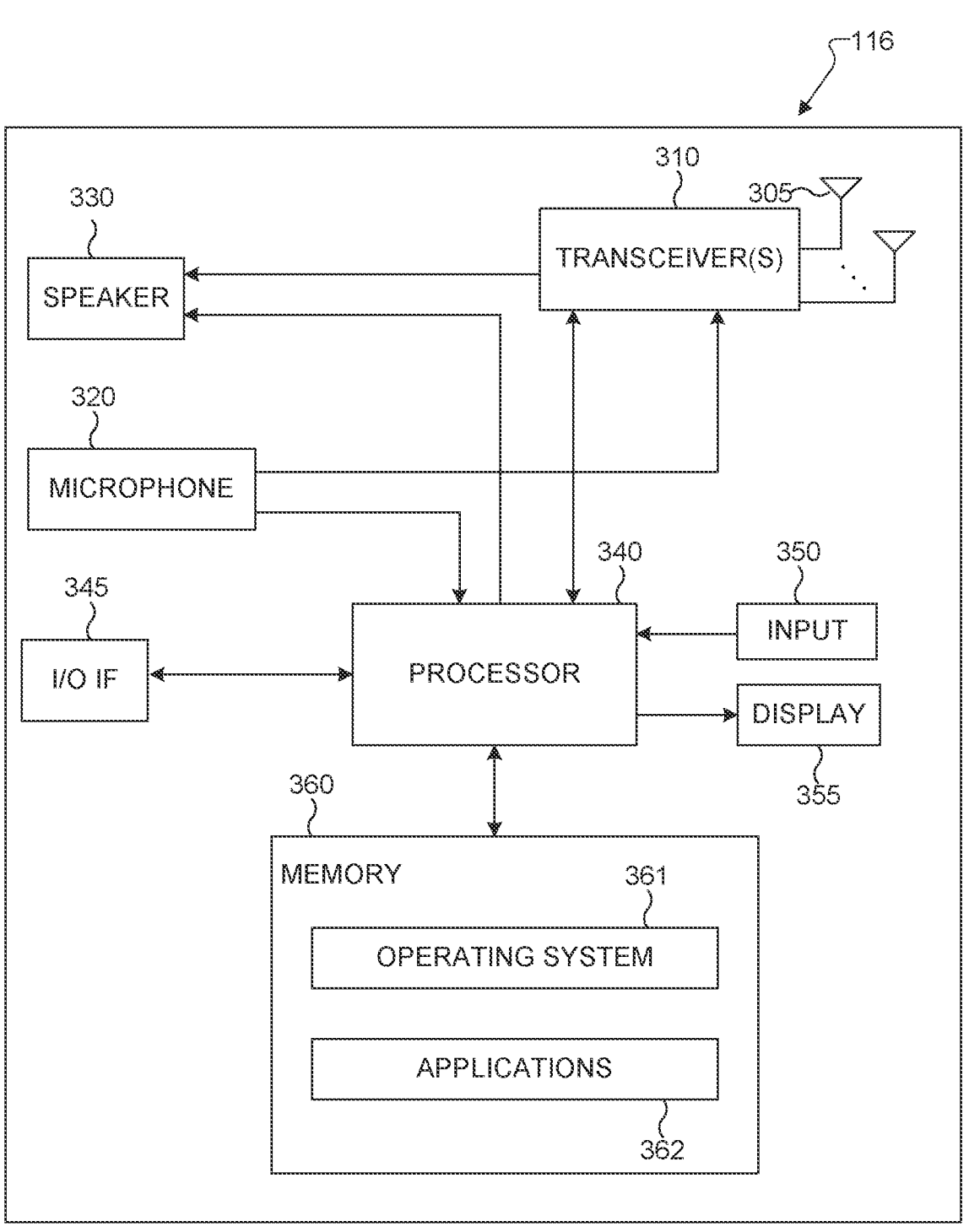
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a timing control for a cross carrier beam indication in a wireless communication system. In certain embodiments, and one or more of the gNBs 101-103 includes circuitry, programing, or a combination thereof, for a timing control for a cross carrier beam indication in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes a timing control for a cross carrier beam indication in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a timing control for a cross carrier beam indication in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
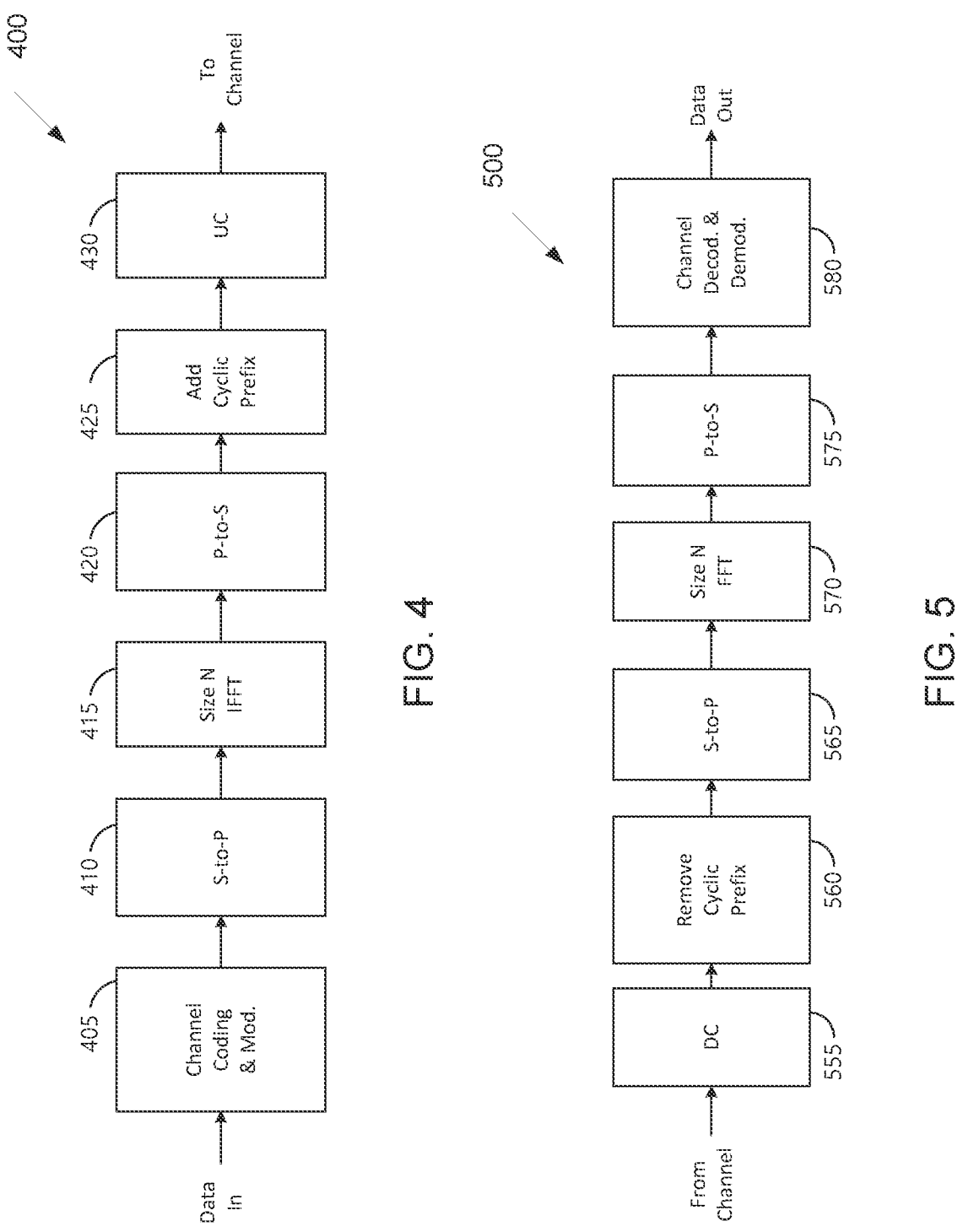
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNB s 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship or spatial relation between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE. The TCI state and/or the spatial relation reference RS can determine a spatial Tx filter for transmission of downlink channels from the gNB, or a spatial Rx filter for reception of uplink channels at the gNB.

Figure 6A:
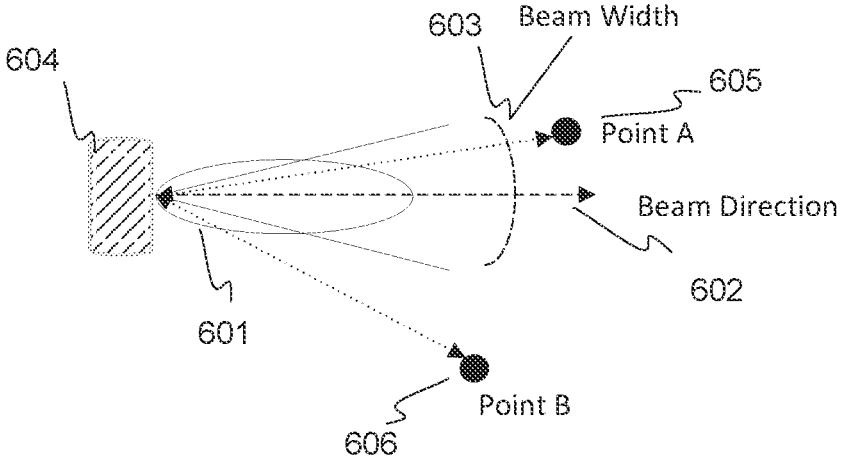
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
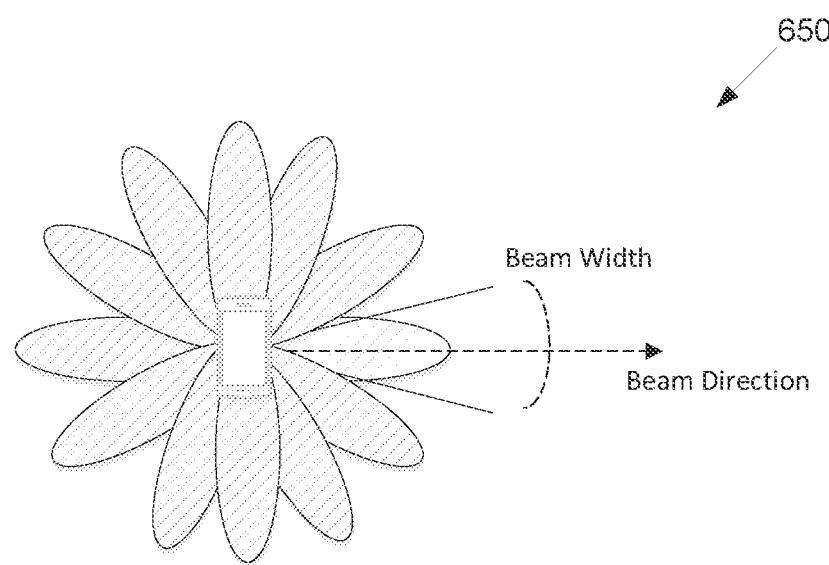
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel. 14 LTE and Rel. 15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
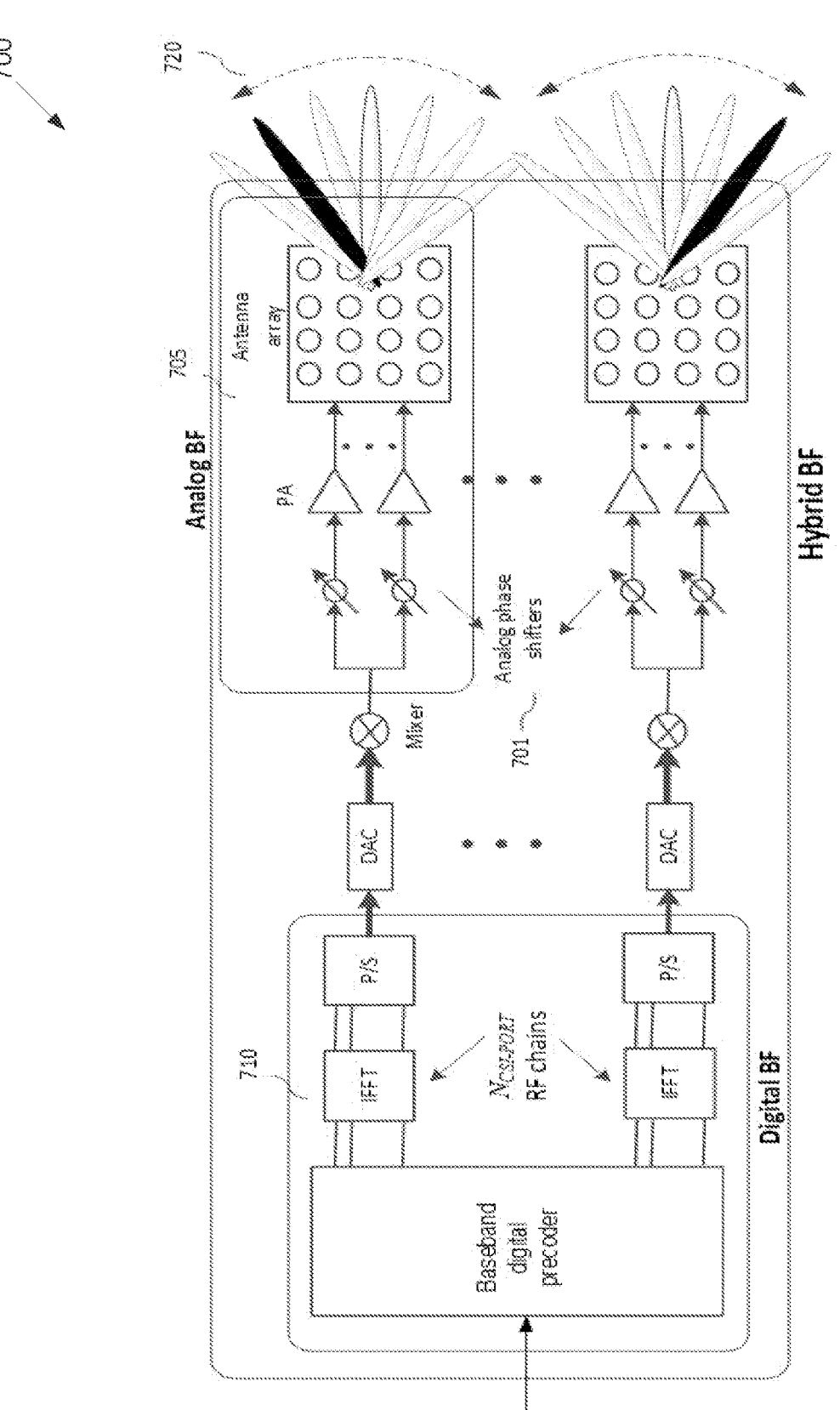
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

Rel-17 introduced the unified TCI framework, where a unified or master or main or indicated TCI state is signaled or indicated to the UE also referred to as the indicated TCI state. The unified or master or main or indicated TCI state can be one of: (1) in case of joint TCI state indication, wherein a same beam is used for DL and UL channels, a joint TCI state that can be used at least for UE-dedicated DL channels and UE-dedicated UL channels; (2) in case of separate TCI state indication, wherein different beams are used for DL and UL channels, a DL TCI state that can be used at least for UE-dedicated DL channels; and (3) in case of separate TCI state indication, wherein different beams are used for DL and UL channels, a UL TCI state that can be used at least for UE-dedicated UL channels.

The unified (master or main or indicated) TCI state is TCI state of UE-dedicated reception on PDSCH/PDCCH or dynamic-grant/configured-grant based PUSCH and all of dedicated PUCCH resources.

The unified TCI framework applies to intra-cell beam management, wherein, the TCI states have a source RS that is directly or indirectly associated, through a quasi-co-location relation, e.g., spatial relation, with an SSB of a serving cell. The unified TCI state framework also applies to inter-cell beam management, wherein a TCI state can have a source RS that is directly or indirectly associated, through a quasi-co-location relation, e.g., spatial relation, with an SSB of cell that has a PCI different from the PCI of the serving cell.

A quasi-co-location (QCL) relation, can be quasi-location with respect to one or more of the following relations (e.g., 3GPP standard specification 38.214): (1) Type A, {Doppler shift, Doppler spread, average delay, delay spread}; (2) Type B, {Doppler shift, Doppler spread}; (3) Type C, {Doppler shift, average delay}; and (4) Type D, {Spatial Rx parameter}.

In addition, quasi-co-location relation can also provide a spatial relation for UL channels, e.g., a DL source reference signal provides information on the spatial domain filter to be used for UL transmissions, or the UL source reference signal provides the spatial domain filter to be used for UL transmissions, e.g., same spatial domain filter for UL source reference signal and UL transmissions.

The unified (master or main or indicated) TCI state applies at least to UE dedicated DL and UL channels. The unified (master or main or indicated) TCI can also apply to other DL and/or UL channels and/or signals e.g., non-UE dedicated channel and sounding reference signal (SRS).

NR provides support for cross carrier scheduling, wherein a DCI format in a first carrier includes a DL scheduling assignment, for DL related DCI formats (e.g., DCI format 1_1 or DCI format 1_2) or an UL scheduling grant, for UL related DCI formats (e.g., DCI format 0_1 or DCI format 0_2) for a second carrier. In the present disclosure, the timing of the application of beam indication for cross-carrier beam indication within the unified beam indication framework is provided.

In release 15/16, a common framework is shared for CSI and beam management, while the complexity of such framework is justified for CSI in a frequency range 1 (FR1), it makes beam management procedures rather cumbersome, and less efficient in an FR2. Efficiency here refers to overhead associated with beam management operations and latency for reporting and indicating new beams.

Furthermore, in release 15 and release 16, the beam management framework is different for different channels. This increases the overhead of beam management, and could lead to less robust beam-based operation. For example, for PDCCH the TCI state (used for beam indication), is updated through MAC CE signaling. While the TCI state of PDSCH can be updated through a DL DCI carrying the DL assignment with codepoints configured by MAC CE, or the PDSCH TCI state can follow that of the corresponding PDCCH, or use a default beam indication. In the uplink direction, the spatialRelationInfo framework is used for beam indication for PUCCH and SRS, which is updated through RRC and MAC CE signaling. For PUSCH the SRI (SRS resource indicator), in an UL DCI with UL grants, can be used for beam indication. Having different beam indications and beam indication update mechanisms increases the complexity, overhead and latency of beam management, and could lead to less robust beam-based operation.

Rel-17 introduced the unified TCI framework, wherein a unified or master or main or indicated TCI state is signaled to the UE. An RRC signaling configures Rel-17 TCI states (e.g., TCI states provided by higher layer parameter dl-OrJoint-TCIStateList in PDSCH-Config or provided by higher layer parameter TCI-UL-State in BWP-UplinkDedicated). A MAC signaling can activate one or more TCI codepoints. When one TCI state codepoint is activated by MAC CE, the UE applies the TCI state(s) associated with the activated codepoint after a beam application time. When more than one TCI codepoints are activated by MAC CE, further DCI signaling is used to indicate a TCI state code-point to the UE. The unified TCI state can be signaled by a DCI format (e.g., DL related DCI format (e.g., DCI format 1_1 or DCI format 1_2) with a DL assignment or a DL related DCI format (e.g., DCI format 1_1 or DCI format 1_2) without a DL assignment.

NR provides support for cross carrier scheduling, wherein a DCI format in a first carrier includes a DL scheduling assignment, for DL related DCI formats (e.g., DCI format 1_1 or DCI format 1_2) or an UL scheduling grant, for UL related DCI formats (e.g., DCI format 0_1 or DCI format 0_2) for a second carrier. In the present disclosure, the timing of the application of beam indication for cross-carrier beam indication within the unified beam indication frame-work is provided.

The present disclosure relates to a 5G/NR communication system. The present disclosure provides design aspects related to extension of TCI state framework developed for the unified TCI state indication in Rel-17 to beam indication for cross carrier scheduling.

In the following, both FDD and TDD are considered as a duplex method for DL and UL signaling.

Although exemplary descriptions and embodiments to follow assume OFDM or OFDMA, the present disclosure can be extended to other OFDM-based transmission wave-forms or multiple access schemes such as filtered OFDM (F-OFDM).

The present disclosure provides several components that can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implic-itly or explicitly indicated, or is otherwise specified in the system operation or is configured by higher layers. Upon successfully decoding the signal, the UE responds according to an indication provided by the signal. The term "deacti-vation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illus-trative purposes and is therefore not normative. Other terms that refer to same functions can also be used.

A "reference RS" corresponds to a set of characteristics of a DL beam or an UL TX beam, such as a direction, a precoding/beamforming, a number of ports, and so on.

In the following components, a TCI state is used for beam indication. It can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRS resource indicator (SRI).

FIG. 8 illustrates an example of UE configuration through a higher layer RRC signaling 800 according to embodiments of the present disclosure. An embodiment of UE configu-ration through a higher layer RRC signaling 800 shown in FIG. 8 is for illustration only.

In the following examples, as illustrated in FIG. 8, a UE is configured/updated through higher layer RRC signaling a set of TCI States with N elements. MAC CE signaling includes a subset of M (M≤N) TCI states from the set of N TCI states, wherein each TCI state is associated with a code point of the DCI field used for indication of the TCI state. A codepoint can include one TCI state (e.g., DL TCI state or UL TCI state or Joint (DL and UL) TCI state). Alternatively, a codepoint can include two TCI states (e.g., a DL TCI state and an UL TCI state). L1 control signaling (i.e., DCI) updates the UE's TCI state, wherein the DCI includes a "transmission configuration indication" (beam indication) field e.g., with m bits (such that M≤2$^m$), the TCI state corresponds to a code point signaled by MAC CE.

A UE is configured with a number of component carriers, CC1, CC2, . . . , CCn. A UE is configured with release 17 TCI states (e.g., TCI states provided by higher layer param-eter dl-OrJoint-TCIStateList in PDSCH-Config or provided by higher layer parameter TCI-UL-State in BWP-Up-linkDedicated).

The UE can use a DL related DCI (e.g., DCI format 1_1 or DCI format 1_2) without DL assignment, for beam indication. For example, the use of DL related DCI without DL assignment, can be configured by higher layers, or can be specified in the system specification.

Alternatively, the UE can use a DL related DCI (e.g., DCI format 1_1 or DCI format 1_2) with DL assignment, for beam indication. For example, the use of DL related DCI with DL assignment, can be configured by higher layers, or can be specified in the system specification.

In the following examples, if a UE is configured with CrossCarrierSchedulingConfig for a serving cell the carrier indicator field value corresponds to the value indicated by CrossCarrierSchedulingConfig.

FIG. 9 illustrates an example of carrier indication 900 according to embodiments of the present disclosure. An embodiment of the carrier indication 900 shown in FIG. 9 is for illustration only.

FIG. 10 illustrates another example of carrier indication 1000 according to embodiments of the present disclosure. An embodiment of the carrier indication 1000 shown in FIG. 10 is for illustration only.

The configuration of a UE with CrossCarrierScheduling-Config can be for: (1) a DL related DCI format (e.g., DCI format 1_1 or DCI format 1_2) with DL assignment, wherein the DL related DCI format (e.g., DCI format 1_1 or DCI format 1_2) with DL assignment includes a "carrier indicator" field, as illustrated in FIG. 9; and/or (2) a DL related DCI format (e.g., DCI format 1_1 or DCI format 1_2) without DL assignment, wherein the DL related DCI format (e.g., DCI format 1_1 or DCI format 1_2) without DL assignment includes a "carrier indicator" field as illus-trated in FIG. 10.

In the following examples, the "transmission configura-tion indication" provided by a DCI format includes a TCI state codepoint activated by MAC CE. Wherein, the TCI state codepoint can be one of: (1) joint TCI state used for UL transmissions and DL receptions by the UE; (2) a DL TCI state used for DL receptions by the UE; (3) a UL TCI state used for UL transmissions by the UE; and (4) a DL TCI state used for DL receptions by the UE and UL TCI states used for UL transmissions by the UE.

The beam application time can be one of the following examples.

Figures 11, 12:
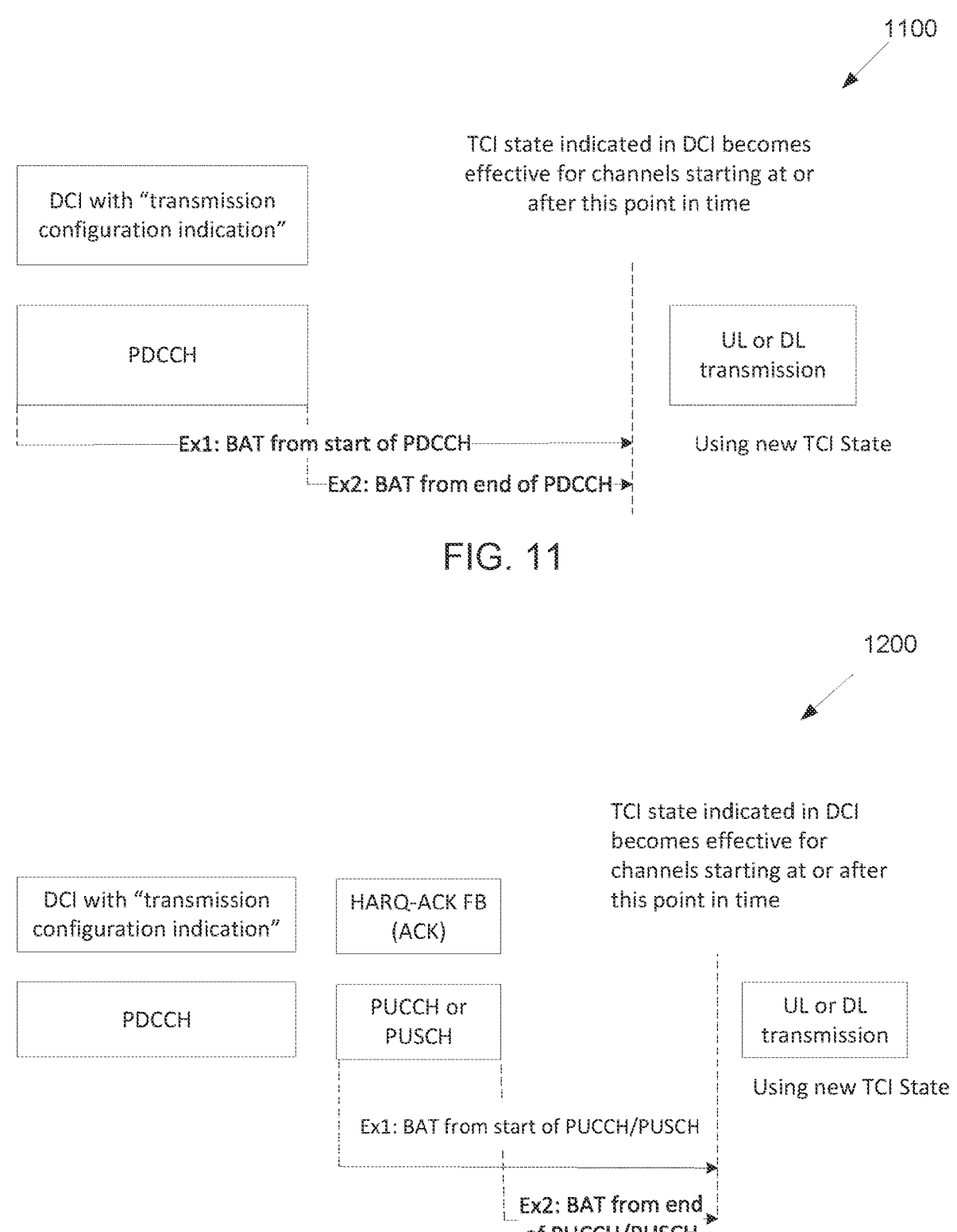
FIG. 11 illustrates an example of transmission configuration indication according to embodiments of the present disclosure.
FIG. 12 illustrates another example of transmission configuration indication according to embodiments of the present disclosure.

FIG. 11 illustrates an example of transmission configuration indication 1100 according to embodiments of the present disclosure. An embodiment of the transmission configuration indication 1100 shown in FIG. 11 is for illustration only.

In one example, the beam application time (BAT) is the time from a PDCCH (start or end of the PDCCH) containing a DCI format that includes the "transmission configuration indication" (beam indication) field to the first symbol (or slot) at which the new beam corresponding to the "transmission configuration indication" is applied. This is illustrated in FIG. 11.

FIG. 12 illustrates another example of transmission configuration indication 1200 according to embodiments of the present disclosure. An embodiment of the transmission configuration indication 1200 shown in FIG. 12 is for illustration only.

In one example, the BAT is the time from a channel (start or end of the channel) containing the HARQ-ACK feedback that indicates reception of a DCI format that includes the "transmission configuration indication" (beam indication) field to the first symbol (or slot) at which the new beam corresponding to the "transmission configuration indication" is applied. This is illustrated in FIG. 12.

In the diagrams used in the remainder of this disclosure, the beam application time (BAT) is assumed to be from the end of the UL channel containing the HARQ-ACK feedback that indicates reception of a DCI format that includes the "transmission configuration indication" (beam indication) (i.e., Ex2 of FIG. 12). However, this does not limit the scope of the following examples to just this example, Ex1 and Ex2 of FIG. 11, as well as Ex1 of FIG. 12 are also applicable.

Figure 13:
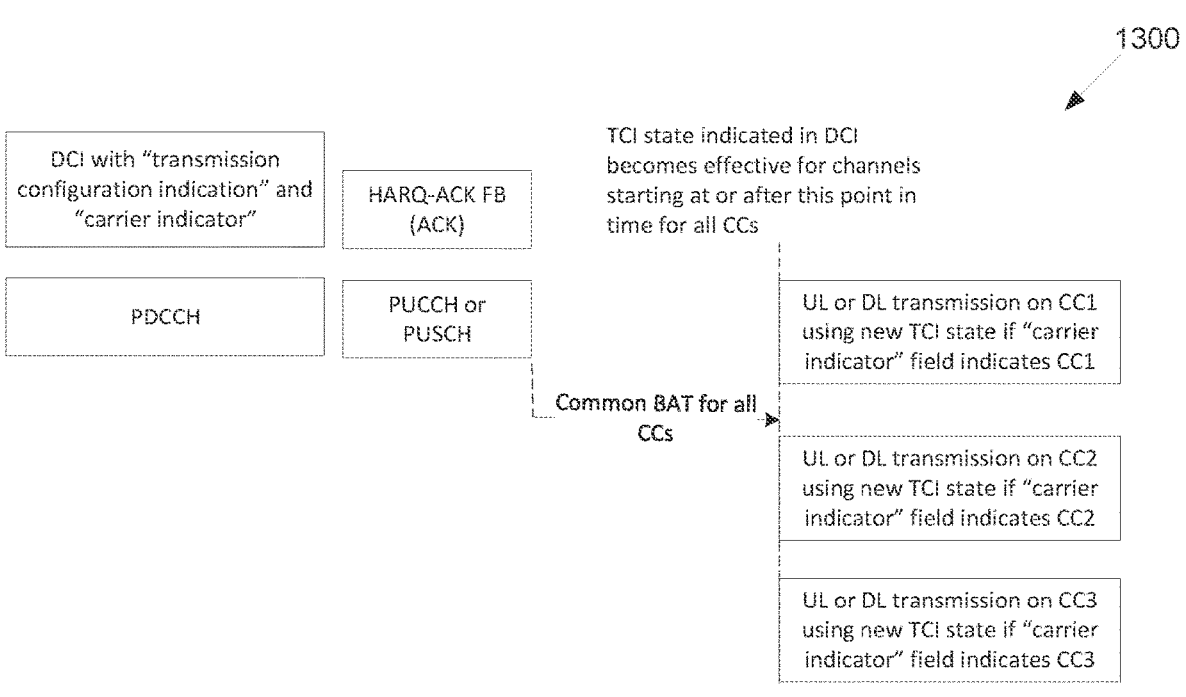
FIG. 13 illustrates an example of beam application time according to embodiments of the present disclosure.

FIG. 13 illustrates an example of beam application time 1300 according to embodiments of the present disclosure. An embodiment of the beam application time 1300 shown in FIG. 13 is for illustration only.

In one example, as illustrated in FIG. 13, one beam application time is determined for all carriers in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field included in a DCI format transmitted on Carrier A.

The DCI format can be: (1) a DL related DCI format (e.g., DCI format 1_1 or DCI format 1_2) with DL assignment; or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) with the smallest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format.

In one example, the carriers (or cells or BWPs) that can be indicated by the "carrier indicator" field including the own (or self) carrier (or cell or BWP) being scheduled by the DCI format as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the beam application time configured for the carrier (or cell or BWP) with the largest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format.

In one example, the carriers (or cells or BWPs) that can be indicated by the "carrier indicator" field including the own (or self) carrier (or cell or BWP) being scheduled by the DCI format as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the largest (or smallest) configured beam application time among one of the following.

In one example, the carriers (or cells or BWPs) that can be indicated by the "carrier indicator" field including the own (or self) carrier (or cell or BWP) being scheduled by the DCI format.

In one example, the carriers (or cells or BWPs) that can be indicated by the "carrier indicator" field including the own (or self) carrier (or cell or BWP) being scheduled by the DCI format as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format as well as the carrier on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

Figure 14:
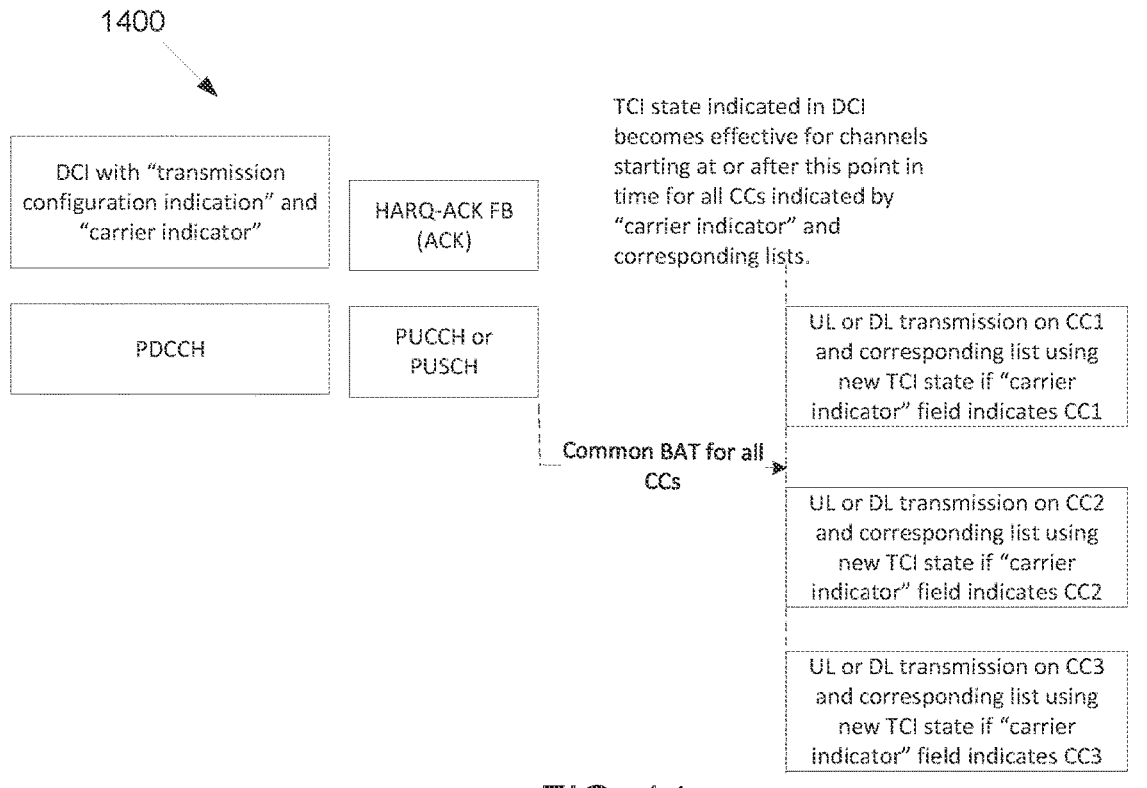
FIG. 14 illustrates another example of beam application time according to embodiments of the present disclosure.

FIG. 14 illustrates another example of beam application time 1400 according to embodiments of the present disclosure. An embodiment of the beam application time 1400 shown in FIG. 14 is for illustration only.

In another example, as illustrated in FIG. 14, a beam indication applies to a list of carriers (or cells or BWPs), wherein the list of carriers (or cells or BWPs) is configured by higher layer (e.g., RRC) signaling. A common beam application time is determined for all carriers in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field included in a DCI format transmitted on Carrier A. The indicated carrier (or cell or BWP) is part of a list of carriers (or cells or BWPs), the "transmission configuration indication" applies to all carriers (or cells or BWPs) in the list.

The DCI format can be: (1) a DL related DCI format (e.g., DCI format 1_1 or DCI format 1_2) with DL assignment; or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) with the smallest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format and corresponding lists of carriers following the same beam.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the beam application time configured for the carrier (or cell or BWP) with the largest sub-carrier spacing. The carriers (or cells or BWPs) are determined among the following examples.

In one example, the carriers (or cells or BWPs) that can be indicated by the "carrier indicator" field including the own (or self) carrier (or cell or BWP) being scheduled by the DCI format and corresponding lists of carriers following the same beam.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

In one example, the beam application time is determined based on the largest (or smallest) configured beam application time among one of the following examples.

In one example, the carriers (or cells or BWPs) that can be indicated by the "carrier indicator" field including the own (or self) carrier (or cell or BWP) being scheduled by the DCI format and corresponding lists of carriers following the same beam.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) used for the HARQ-ACK feedback of the DCI format that includes the "transmission configuration indication" field.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier on which the DCI format that includes the "transmission configuration indication" field is transmitted.

In one example, the carriers (or cells or BWPs) that can be indicated by the "carrier indicator" field including the own (or self) carrier (or cell or BWP) being scheduled by the DCI format and corresponding lists of carriers following the same beam as well as the carrier (or cell or BWP) on which the DCI format that includes the "transmission configuration indication" field is transmitted and the carrier (or cell or BWP) used for the HARQ-ACK feedback of the DCI format that includes the "transmission configuration indication" field.

Figure 15:
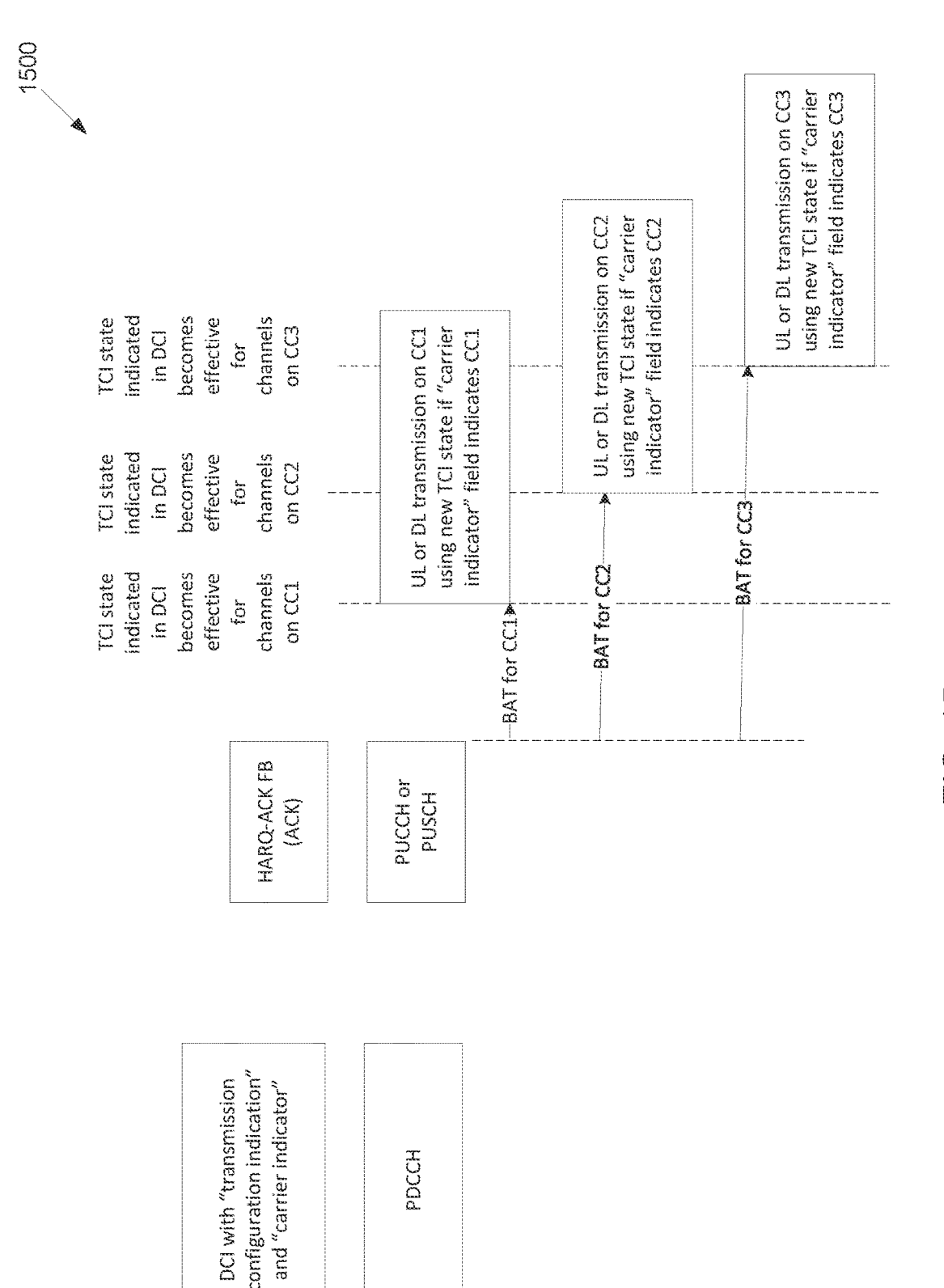
FIG. 15 illustrates yet another example of beam application time according to embodiments of the present disclosure.

FIG. 15 illustrates yet another example of beam application time 1500 according to embodiments of the present disclosure. An embodiment of the beam application time 1500 shown in FIG. 15 is for illustration only.

In another example, as illustrated in FIG. 15, a beam application time is determined for each carrier (or cell or BWP) in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field included in a DCI format transmitted on Carrier A. The DCI format can be: (1) a DL related DCI format (e.g., DCI format 1_1 or DCI format 1_2) with DL assignment; or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) to which the "transmission configuration indication" is to be applied as indicated by the "carrier indicator" field.

In one example, the beam application time is determined based on the configured beam application time of a carrier (or cell or BWP) with the smallest sub-carrier spacing among one of the following examples.

In one example, the carrier (or cell or BWP) indicated by the "carrier indicator" field and the carrier used for the HARQ-ACK feedback of the DCI format that includes the "transmission configuration indication" field.

In one example, the carrier (or cell or BWP) indicated by the "carrier indicator" field and the carrier on which the DCI format that includes the "transmission configuration indication" field is transmitted.

In one example, the carrier (or cell or BWP) indicated by the "carrier indicator" field and the carrier on which the DCI format that includes the "transmission configuration indication" field is transmitted and the carrier used for the HARQ-ACK feedback of the DCI format that includes the "transmission configuration indication" field.

In one example, the beam application time is determined based on the configured beam application time of a carrier with the largest sub-carrier spacing among one of the following examples.

In one example, the carrier (or cell or BWP) indicated by the "carrier indicator" field and the carrier used for the HARQ-ACK feedback of the DCI format that includes the "transmission configuration indication" field.

In one example, the carrier (or cell or BWP) indicated by the "carrier indicator" field and the carrier on which the DCI format that includes the "transmission configuration indication" field is transmitted.

In one example, the carrier (or cell/or BWP) indicated by the "carrier indicator" field and the carrier on which the DCI format that includes the "transmission configuration indication" field is transmitted, and the carrier used for the HARQ-ACK feedback of the DCI format that includes the "transmission configuration indication" field.

In one example, the beam application time is determined based on the largest (or smallest) configured beam application time among one of the following examples.

In one example, the carrier (or cell or BWP) indicated by the "carrier indicator" field and the carrier used for the HARQ-ACK feedback of the DCI format that includes the "transmission configuration indication" field.

In one example, the carrier (or cell or BWP) indicated by the "carrier indicator" field and the carrier on which the DCI format that includes the "transmission configuration indication" field is transmitted.

In one example, the carrier (or cell or BWP) indicated by the "carrier indicator" field and the carrier on which the DCI format that includes the "transmission configuration indication" field is transmitted, and the carrier used for the HARQ-ACK feedback of the DCI format that includes the "transmission configuration indication" field.

Figure 16:
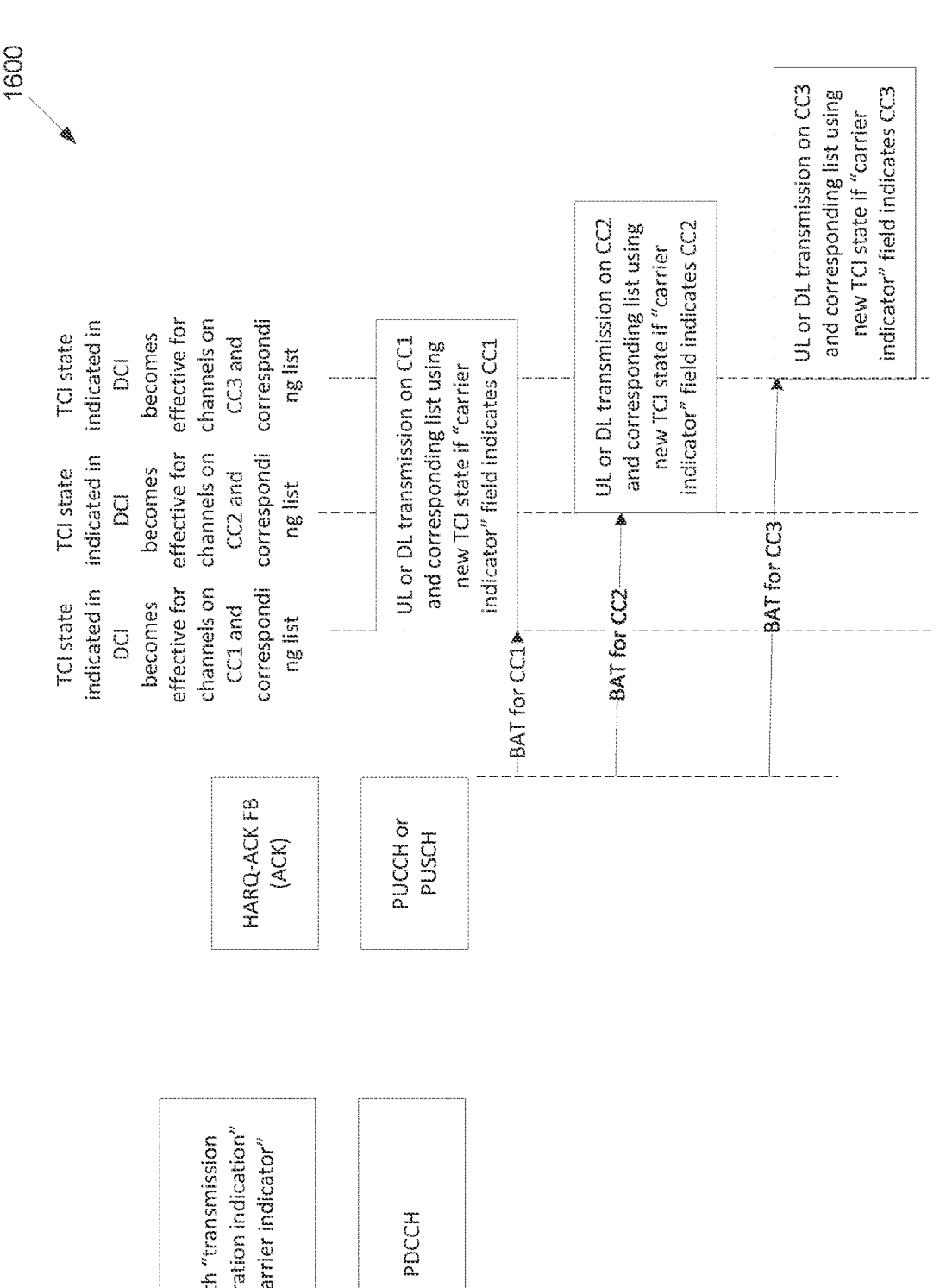
FIG. 16 illustrates yet another example of beam application time according to embodiments of the present disclosure.

FIG. 16 illustrates yet another example of beam application time 1600 according to embodiments of the present disclosure. An embodiment of the beam application time 1600 shown in FIG. 16 is for illustration only.

In another example, as illustrated in FIG. 16, a beam indication applies to a list of carriers (or cells or BWPs), wherein the list of carriers (or cells or BWPs) is configured by higher layer (e.g., RRC) signaling. A beam application time is determined for each list of carriers in case of cross-carrier scheduling and beam indication. Carrier A includes the DCI format that provides "transmission configuration indication" (beam indication) field (e.g., TCI_state_id or TCI state codepoint from the codepoints activated by MAC CE). In addition to carrier A, carriers B1, B2, . . . are carriers that can be indicated by the "carrier indicator" field included in a DCI format transmitted on Carrier A. The indicated carrier (or cell or BWP) is part of a list of carriers (or cells or BWPs), the "transmission configuration indication" applies to all carriers (or cells or BWPs) in the list.

The DCI format can be: (1) a DL related DCI format (e.g., DCI format 1_1 or DCI format 1_2) with DL assignment; or (2) a DL related DCI format (e.g., DCI format 1_1 or DCI format 1_2) without DL assignment.

In one example, a beam application time is configured for each carrier (or cell or BWP).

In one example, the beam application time is determined based on the beam application time configured for the carrier (or cell or BWP) to which the "transmission configuration indication" is to be applied as indicated by the "carrier indicator" field and carriers (or cells or BWPs) in the corresponding list following the same beam. The beam application is that configured for the carrier (cell or BWP) with the smallest sub-carrier spacing among the aforementioned.

In one example, the beam application time is determined based on the beam application time configured for the carrier (or cell or BWP) to which the "transmission configuration indication" is to be applied as indicated by the "carrier indicator" field and carriers (or cells or BWPs) in the corresponding list following the same beam. The beam application is that configured for the carrier (cell or BWP) with the largest sub-carrier spacing among the aforementioned.

In one example, the beam application time is determined based on the configured beam application time of a carrier (or cell or BWP) with the smallest sub-carrier spacing among one of the following examples.

In one example, the carrier (or cell or BWP) indicated by the "carrier indicator" field and corresponding list following the same beam and the carrier used for the HARQ-ACK feedback of the DCI format that includes the "transmission configuration indication" field.

In one example, the carrier (or cell or BWP) indicated by the "carrier indicator" field and corresponding list following the same beam and the carrier on which the DCI format that includes the "transmission configuration indication" field is transmitted.

In one example, the carrier (or cell or BWP) indicated by the "carrier indicator" field and corresponding list following the same beam and the carrier on which the DCI format that includes the "transmission configuration indication" field is transmitted, and the carrier used for the HARQ-ACK feedback of the DCI format that includes the "transmission configuration indication" field.

In one example, the beam application time is determined based on the configured beam application time of a carrier (or cell or BWP) with the largest sub-carrier spacing among one of the following examples.

In one example, the carrier (or cell or BWP) indicated by the "carrier indicator" field and corresponding list following the same beam and the carrier used for the HARQ-ACK feedback of the DCI format that includes the "transmission configuration indication" field.

In one example, the carrier (or cell or BWP) indicated by the "carrier indicator" field and corresponding list following the same beam and the carrier on which the DCI format that includes the "transmission configuration indication" field is transmitted.

In one example, the carrier (or cell or BWP) indicated by the "carrier indicator" field and corresponding list following the same beam and the carrier on which the DCI format that includes the "transmission configuration indication" field is transmitted, and the carrier used for the HARQ-ACK feedback of the DCI format that includes the "transmission configuration indication" field.

In one example, the beam application time is determined based on the largest (or smallest) configured beam application time among one of the following examples.

In one example, the carrier (or cell or BWP) indicated by the "carrier indicator" field and corresponding list following the same beam.

In one example, the carrier (or cell and/or BWP) indicated by the "carrier indicator" field and corresponding list following the same beam and the carrier used for the HARQ-ACK feedback of the DCI format that includes the "transmission configuration indication" field.

In one example, the carrier (or cell or BWP) indicated by the "carrier indicator" field and corresponding list following the same beam and the carrier on which the DCI format that includes the "transmission configuration indication" field is transmitted.

In one example, the carrier (or cell or BWP) indicated by the "carrier indicator" field and corresponding list following the same beam and the carrier on which the DCI format that includes the "transmission configuration indication" field is transmitted, and the carrier used for the HARQ-ACK feedback of the DCI format that includes the "transmission configuration indication" field.

Various embodiments of the present disclosure provide a timing (beam application time) operation for a cross carrier beam indication for a unified TCI framework.

In one example, the UE is: (1) not configured with cross carrier scheduling, e.g., there is no "carrier indicator" field in a DL related DCI format (e.g., DCI format 1_1 or DCI format 1_2) with DL assignment. The DCI format with DL assignment is used for its own (self) carrier (or cell or BWP); and/or (2) configured with cross carrier beam indication, wherein a DL related DCI format (e.g., DCI format 1_1 or DCI format 1_2) without DL assignment, can include a "carrier indicator" field. The "carrier indicator" field indicates the carrier (or cell or BWP) to which the indicated beam is applied.

When the UE is not configured with CrossCarrierSchedulingConfig, or if the "carrier indicator" field in a DCI format, e.g., DCI format 1_1 or DCI format 1_2 with DL assignment or DCI format 1_1 or DCI format 1_2 without DL assignment, indicates self-carrier, the TCI state codepoint indicated by the field "Transmission Configuration Indicator" in the DCI format is applied to the self-carrier, i.e., the carrier on which the DCI format is transmitted. The TCI state(s) indicated by the TCI state codepoint is a TCI state(s) configured and/or activated for the carrier on which the DCI is transmitted.

When the UE is configured with CrossCarrierSchedulingConfig, and if the "carrier indicator" field in a DCI format, e.g., DCI format 1_1 or DCI format 1_2 with DL assignment or DCI format 1_1 or DCI format 1_2 without DL assignment, indicates a carrier other than the self-carrier, the TCI state codepoint indicated by the field "Transmission Configuration Indicator" in the DCI format is applied to carrier indicated by the carrier indicator" field in the DCI format. The TCI state(s) indicated by the TCI state codepoint is a TCI state(s) configured and/or activated for the carrier indicated by the carrier indicator" field in the DCI format.

Figures 17A, 17B:
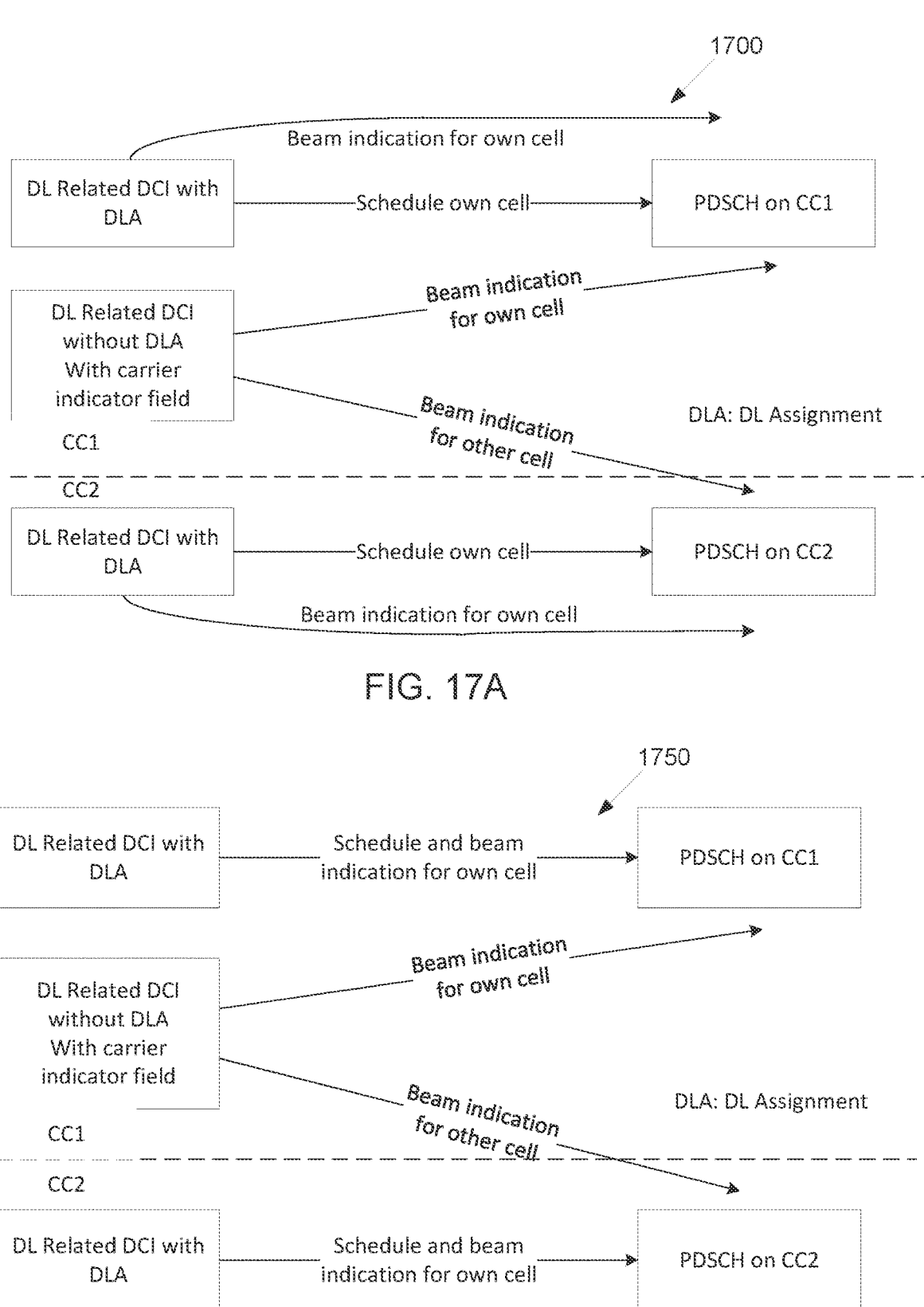
FIG. 17A illustrates an example of beam indication provided by a DCI format according to embodiments of the present disclosure.
FIG. 17B illustrates an example of beam indication provided by a DCI format according to embodiments of the present disclosure.

FIG. 17A illustrates an example of beam indication provided by a DCI format 1700 according to embodiments of the present disclosure. An embodiment of the beam indication provided by a DCI format 1700 shown in FIG. 17A is for illustration only.

FIG. 17B illustrates an example of beam indication provided by a DCI format 1750 according to embodiments of the present disclosure. An embodiment of the beam indication provided by a DCI format 1750 shown in FIG. 17B is for illustration only.

In one example, the DCI format (e.g., DCI format 1_1 or DCI format 1_2) with DL assignment can be configured to include "transmission configuration indication" (beam indication) field (e.g., TCI_state_id or TCI state codepoint from the codepoints activated by MAC CE). The "transmission configuration indication" (beam indication" in the DCI format (e.g., DCI format 1_1 or DCI format 1_2) with DL assignment is used for its own (self) carrier (or cell or BWP). In FIG. 17A and FIG. 17B, the DL related DCI with DL assignment includes a "transmission configuration indication" (beam indication) for own (or self) carrier (or cell or BWP). The DL related DCI without DL assignment includes a "transmission configuration indication" (beam indication) for own (or self) carrier (or cell or BWP) or another carrier (or cell or BWP) based on the "carrier indicator" field.

In FIG. 17A, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In FIG. 17B, as a variant, when the beam indication ("transmission configuration indication") is provided a DL related DCI format (e.g., DCI format 1_1 or DCI format 1_2) with a DL assignment, the beam can be applied to the PDSCH channel scheduled by the DCI format.

Figure 18:
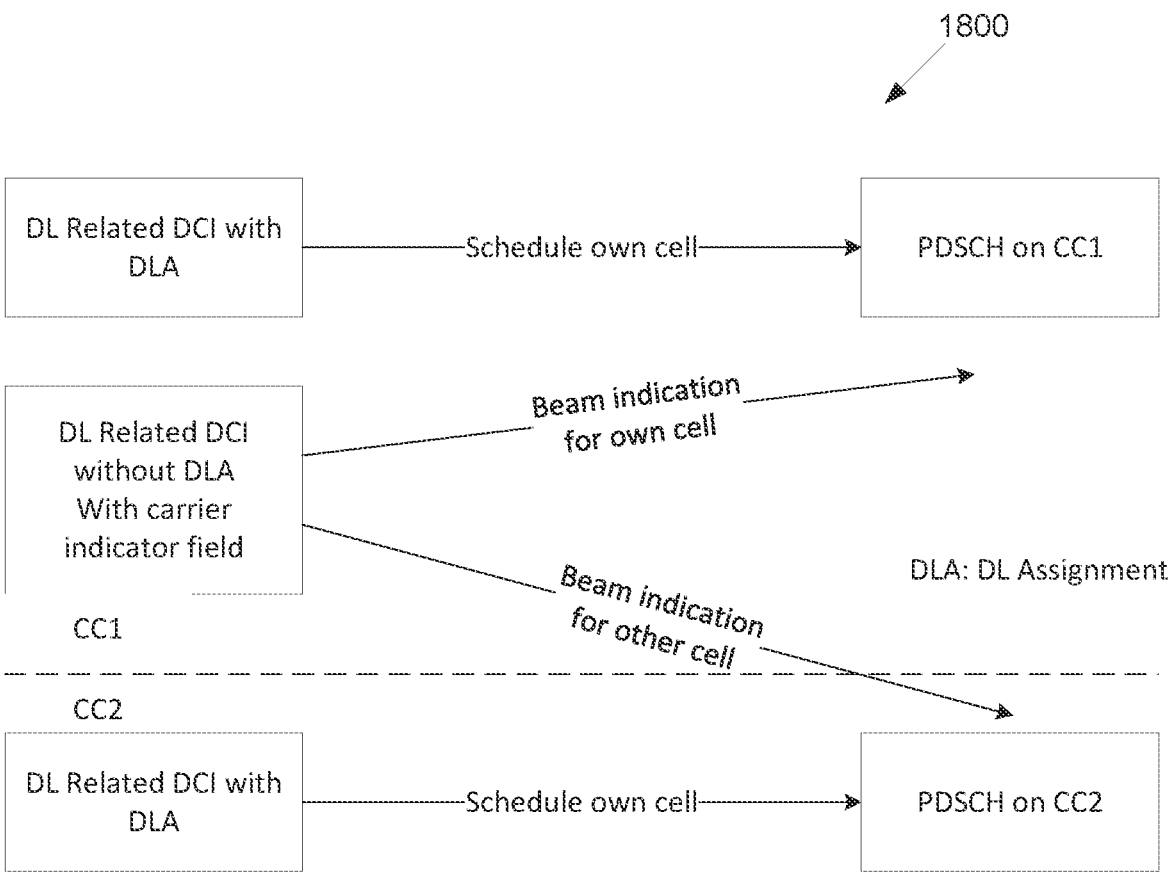
FIG. 18 illustrates yet another example of beam indication provided by a DCI format according to embodiments of the present disclosure.

FIG. 18 illustrates yet another example of beam indication provided by a DCI format 1800 according to embodiments of the present disclosure. An embodiment of the beam indication provided by a DCI format 1800 shown in FIG. 18 is for illustration only.

In another example, the DCI format (e.g., DCI format 1_1 or DCI format 1_2) with DL assignment can be configured to not include a beam indication. In FIG. 18, the DL related DCI with DL assignment does not include a "transmission configuration indication" (beam indication). The DL related DCI without DL assignment includes a "transmission configuration indication" (beam indication) for own (or self) carrier (or cell or BWP) or another carrier (or cell or BWP) based on the "carrier indicator" field.

In FIG. 18, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In another example, the UE is: (1) not configured with cross carrier scheduling, e.g., there is no "carrier indicator" field in a DL related DCI format (e.g., DCI format 1_1 or DCI format 1_2) with DL assignment. The DCI format with DL assignment is used for its own (self) carrier (or cell or BWP). For the CC that provides the DL related DCI format without DL assignment, the DCI format with DL assignment includes a "transmission configuration indication" (beam indication) field for that carrier (cell); and/or (2) configured with cross carrier beam indication, wherein a DL related DCI format (e.g., DCI format 1_1 or DCI format 1_2) without DL assignment, indicates the beam for the other carrier. In this example, if there is only one other carrier, there is no "carrier indicator" field as the DCI format without DL assignment is indicating the "transmission configuration indication" (beam indication) of that other carrier. If there is more than one other carrier, there is a "carrier indicator" field to indicate the carrier to which the indicated beam ("transmission configuration indication") applies.

When the UE is not configured with CrossCarrierSchedulingConfig, or if the "carrier indicator" field in a DCI format, e.g., DCI format 1_1 or DCI format 1_2 with DL assignment or DCI format 1_1 or DCI format 1_2 without DL assignment, indicates self-carrier, the TCI state codepoint indicated by the field "Transmission Configuration Indicator" in the DCI format is applied to the self-carrier, i.e., the carrier on which the DCI format is transmitted. The TCI state(s) indicated by the TCI state codepoint is a TCI state(s) configured and/or activated for the carrier on which the DCI is transmitted.

When the UE is configured with CrossCarrierSchedulingConfig, and if the "carrier indicator" field in a DCI format, e.g., DCI format 1_1 or DCI format 1_2 with DL assignment or DCI format 1_1 or DCI format 1_2 without DL assignment, indicates a carrier other than the self-carrier, the TCI state codepoint indicated by the field "Transmission Configuration Indicator" in the DCI format is applied to carrier indicated by the carrier indicator" field in the DCI format. The TCI state(s) indicated by the TCI state codepoint is a TCI state(s) configured and/or activated for the carrier indicated by the carrier indicator" field in the DCI format.

Figure 19A:
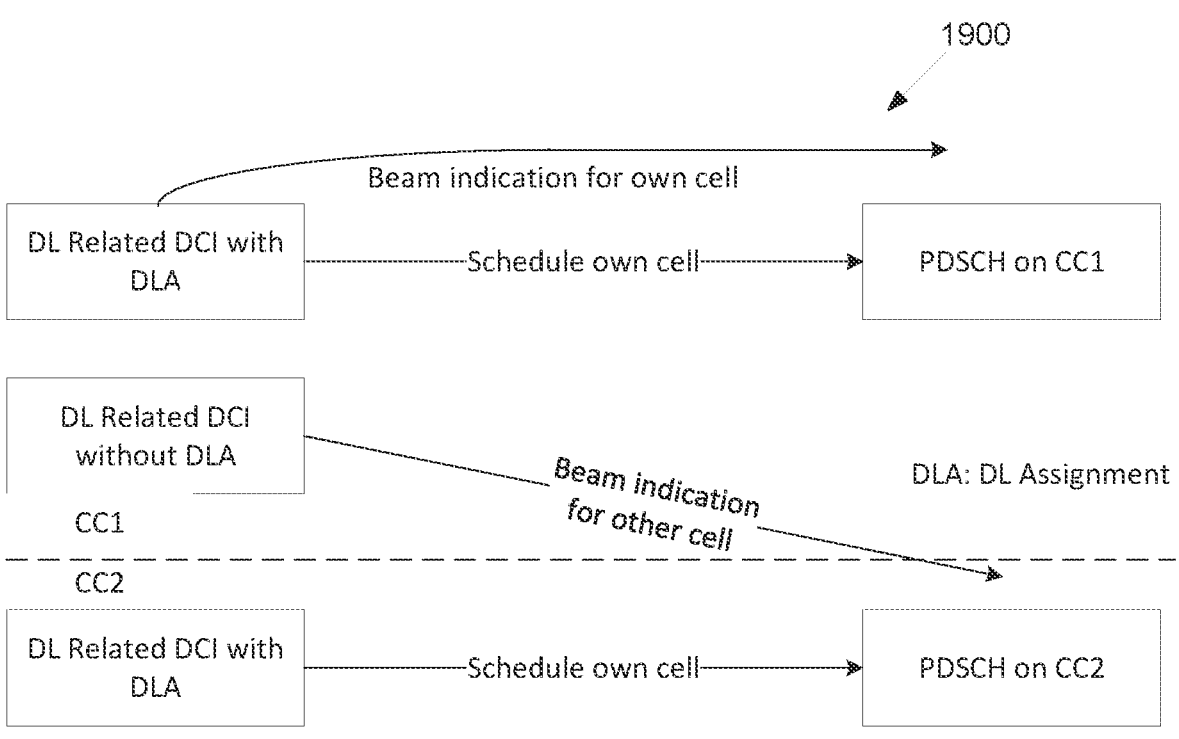
FIG. 19A illustrates yet example of beam indication provided by a DCI format according to embodiments of the present disclosure.

FIG. 19A illustrates yet example of beam indication provided by a DCI format 1900 according to embodiments of the present disclosure. An embodiment of the beam indication provided by a DCI format 1900 shown in FIG. 19A is for illustration only.

Figure 19B:
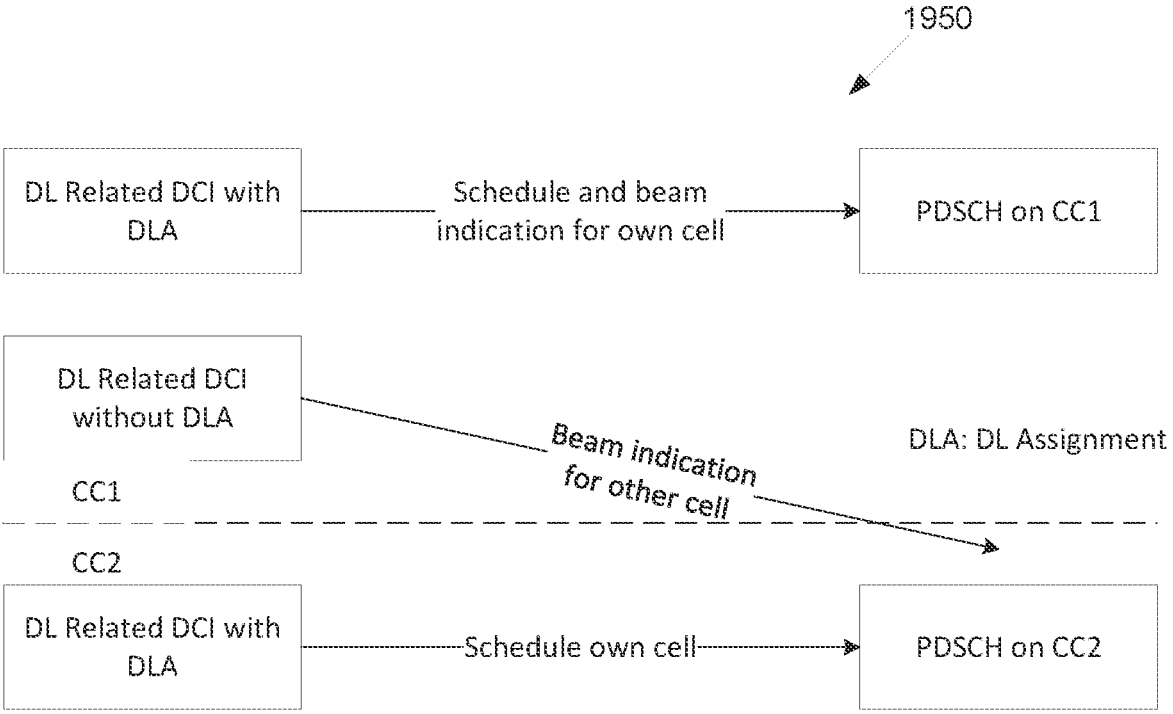
FIG. 19B illustrates yet example of beam indication provided by a DCI format according to embodiments of the present disclosure.

FIG. 19B illustrates yet example of beam indication provided by a DCI format 1950 according to embodiments of the present disclosure. An embodiment of the beam indication provided by a DCI format 1950 shown in FIG. 19B is for illustration only.

In one example, the DCI format (e.g., DCI format 1_1 or DCI format 1_2) with DL assignment, on the carrier (or cell or BWP) that does not provide DL related DCI format without DL assignment (e.g., CC2 in FIG. 19A) can be configured to not include "transmission configuration indication" (beam indication) field. In FIG. 19A, the DL related DCI with DL assignment includes a "transmission configuration indication" (beam indication) for own (or self) carrier (or cell or BWP) for CC1 but not for CC2. The DL related DCI without DL assignment (transmitted on CC1) includes a "transmission configuration indication" (beam indication) for the other carrier (or cell or BWP), i.e., CC2.

In FIG. 19A, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In FIG. 19B, as a variant, when the beam indication ("transmission configuration indication") is provided a DL related DCI format (e.g., DCI format 1_1 or DCI format 1_2) with a DL assignment, the beam can be applied to the PDSCH channel scheduled by the DCI format.

Figure 20A:
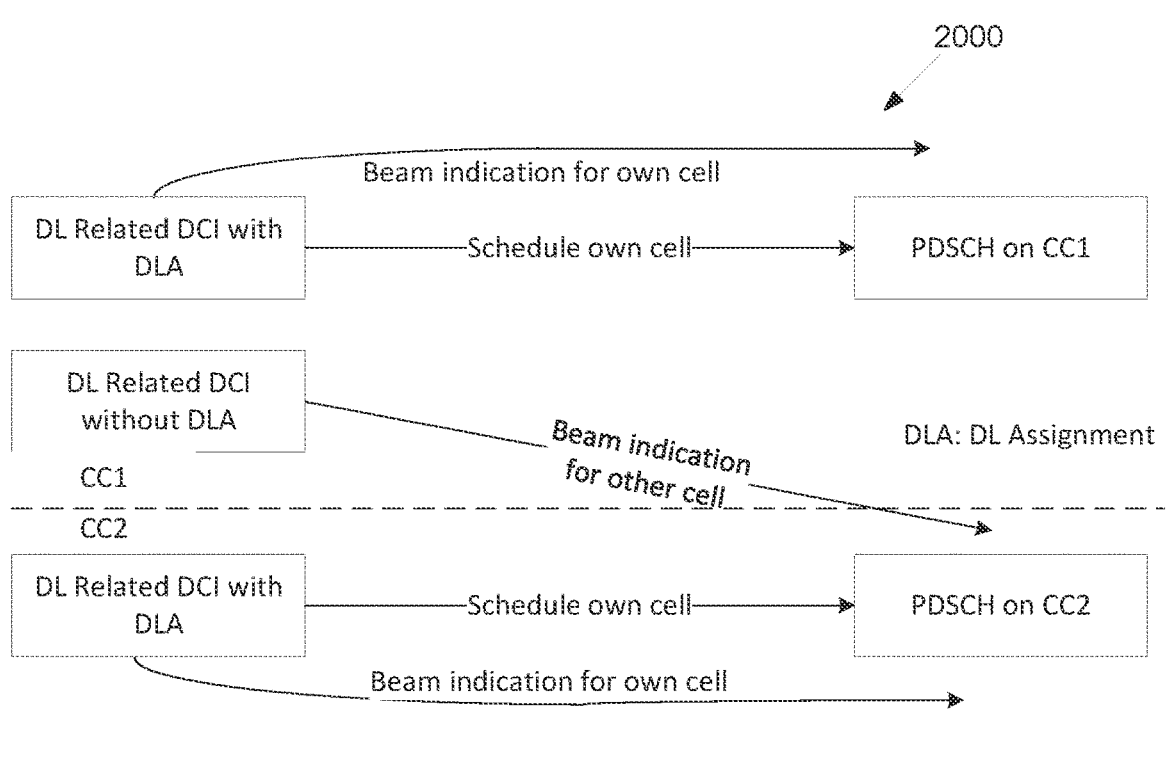
FIG. 20A illustrates an example of beam indication provided by a DL related DCI format according to embodiments of the present disclosure.

In one example, the DCI format (e.g., DCI format 1_1 or DCI format 1_2) with DL assignment, on the carrier (or cell or BWP) that does not provide DL related DCI format without DL assignment (e.g., CC2 in FIG. 20A) can be configured to also include "transmission configuration indication" (beam indication) field (e.g., TCI_state_id or TCI state codepoint from the codepoints activated by MAC CE). In FIG. 20A, the DL related DCI format with DL assignment includes a beam indication for own (or self) carrier (or cell or BWP) for both CC1 and CC2. The DL related DCI without DL assignment includes a "transmission configuration indication" (beam indication) for another carrier (or cell or BWP), i.e., CC2.

FIG. 20A illustrates an example of beam indication provided by a DL related DCI format 2000 according to embodiments of the present disclosure. An embodiment of the beam indication provided by a DL related DCI format 2000 shown in FIG. 20A is for illustration only.

Figure 20B:
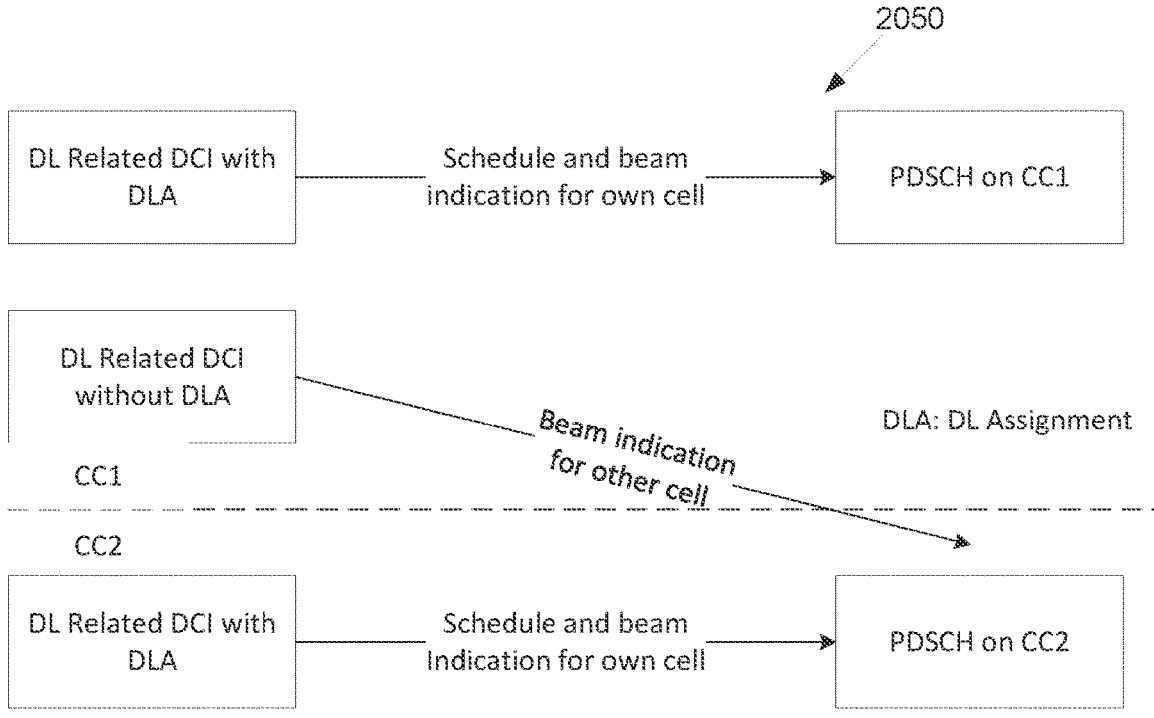
FIG. 20B illustrates another example of beam indication provided by a DL related DCI format according to embodiments of the present disclosure.

FIG. 20B illustrates another example of beam indication provided by a DL related DCI format 2050 according to embodiments of the present disclosure. An embodiment of the beam indication provided by a DL related DCI format 2050 shown in FIG. 20B is for illustration only.

In FIG. 20A, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In FIG. 20B, as a variant, when the beam indication ("transmission configuration indication") is provided a DL related DCI format (e.g., DCI format 1_1 or DCI format 1_2) with a DL assignment, the beam can be applied to the PDSCH channel scheduled by the DCI format.

In one example, the UE is configured with cross carrier scheduling, e.g., there is a "carrier indicator" field in a DL related DCI format (e.g., DCI format 1_1 or DCI format 1_2) with DL assignment. The DCI format with DL assignment is used for its own (self) carrier (or cell or BWP) or other carriers (or cells or BWPs) based on the "carrier indicator" field. The DCI format (e.g., DCI format 1_1 or DCI format 1_2) with DL assignment can be configured to include "transmission configuration indication" (beam indication) field (e.g., TCI_state_id or TCI state codepoint from the codepoints activated by MAC CE). The "transmission configuration indication" field can be used to indicate the beam of its own (self) carrier (or cell or BWP), or the beam of the other carrier (or cell or BWP) according to the indicated "carrier indicator" field.

When the UE is not configured with CrossCarrierSchedulingConfig, or if the "carrier indicator" field in a DCI format, e.g., DCI format 1_1 or DCI format 1_2 with DL assignment, indicates self-carrier, the TCI state codepoint indicated by the field "Transmission Configuration Indicator" in the DCI format is applied to the self-carrier, i.e., the carrier on which the DCI format is transmitted. The TCI state(s) indicated by the TCI state codepoint is a TCI state(s) configured and/or activated for the carrier on which the DCI is transmitted.

When the UE is configured with CrossCarrierSchedulingConfig, and if the "carrier indicator" field in a DCI format, e.g., DCI format 1_1 or DCI format 1_2 with DL assignment, indicates a carrier other than the self-carrier, the TCI state codepoint indicated by the field "Transmission Configuration Indicator" in the DCI format is applied to carrier indicated by the carrier indicator" field in the DCI format. The TCI state(s) indicated by the TCI state codepoint is a TCI state(s) configured and/or activated for the carrier indicated by the carrier indicator" field in the DCI format.

Figure 21A:
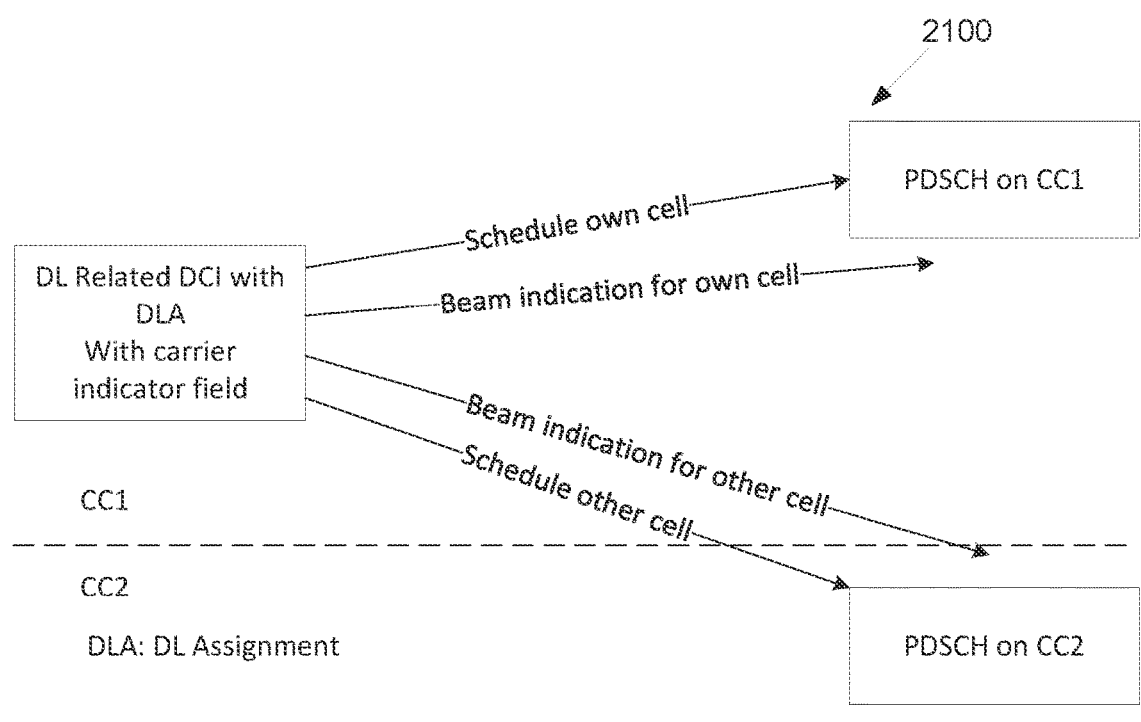
FIG. 21A illustrates yet another example of beam indication provided by a DL related DCI format according to embodiments of the present disclosure.

FIG. 21A illustrates yet another example of beam indication provided by a DL related DCI format 2100 according to embodiments of the present disclosure. An embodiment of the beam indication provided by a DL related DCI format 2100 shown in FIG. 21A is for illustration only.

In FIG. 21A, the DL related DCI format with DL assignment includes a "carrier indicator" field that provides the carrier (or cell or BWP) for which the scheduling assignment and the "transmission configuration indication" (beam indication) in the DCI format is to be applied. A scheduling assignment and a "transmission configuration indication" (beam indication) can be for own (or self) carrier (or cell or BWP) or for another carrier (or cell or BWP) based on the "carrier indicator" field.

In FIG. 21A, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

Figure 21B:
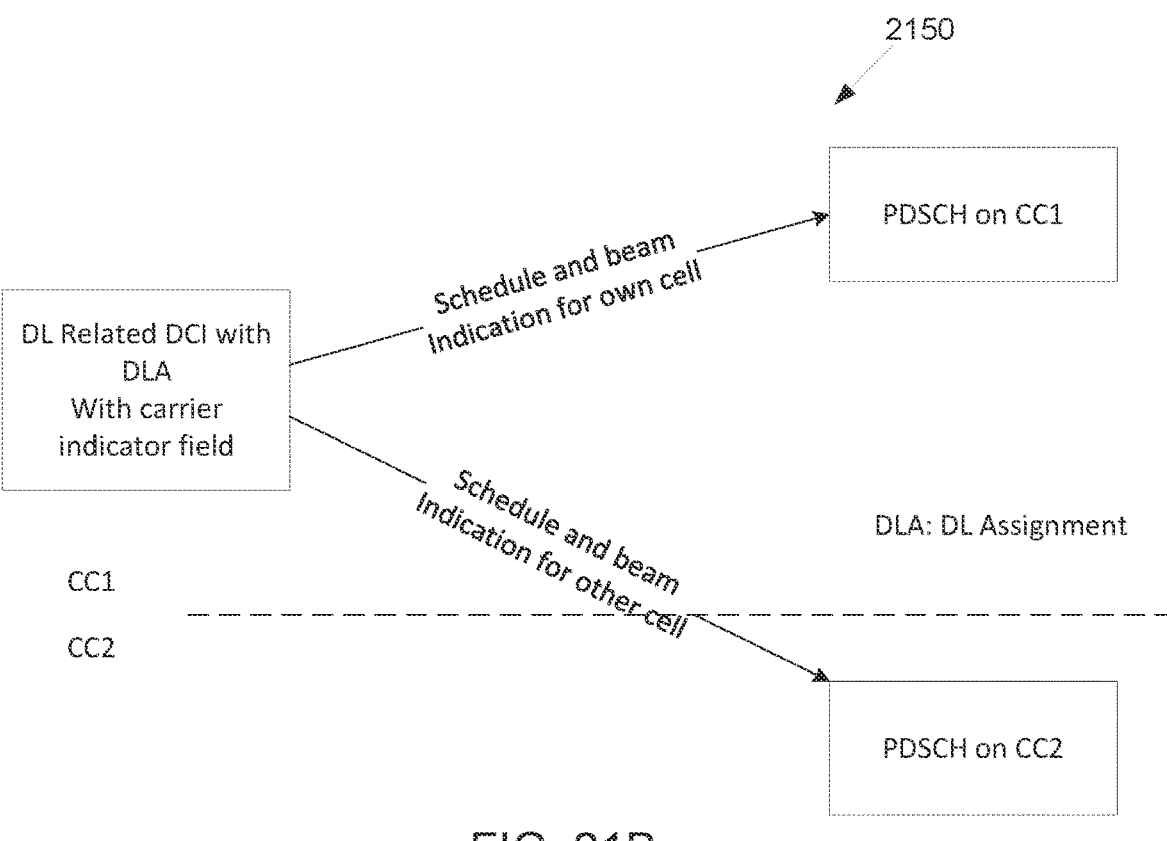
FIG. 21B illustrates yet another example of beam indication provided by a DL related DCI format according to embodiments of the present disclosure.

FIG. 21B illustrates yet another example of beam indication provided by a DL related DCI format 2150 according to embodiments of the present disclosure. An embodiment of the beam indication provided by a DL related DCI format 2150 shown in FIG. 21B is for illustration only.

In FIG. 21B, as a variant, when the beam indication ("transmission configuration indication") is provided a DL related DCI format (e.g., DCI format 1_1 or DCI format 1_2) with a DL assignment, the beam can be applied to the PDSCH channel scheduled by the DCI format.

In one example, the UE is: (1) configured with cross carrier scheduling, e.g., there is a "carrier indicator" field in a DL related DCI format (e.g., DCI format 1_1 or DCI format 1_2) with DL assignment. The DCI format with DL assignment is used for its own (self) carrier (or cell or BWP) or other carriers (or cells or BWPs) based on the "carrier indicator" field; and/or (2) configured with cross carrier beam indication, wherein a DL related DCI format (e.g., DCI format 1_1 or DCI format 1_2) without DL assignment, can include a "carrier indicator" field. The carrier indicator field indicates the carrier (or cell or BWP) to which the indicated beam ("transmission configuration indication") is applied. In one example, there are separate configurations for configuring cross carrier scheduling and for configuring cross carrier beam indication. In another example, a same configuration is used to configure both cross-carrier scheduling and cross-carrier beam indication.

When the UE is not configured with CrossCarrierSchedulingConfig, or if the "carrier indicator" field in a DCI format, e.g., DCI format 1_1 or DCI format 1_2 with DL assignment or DCI format 1_1 or DCI format 1_2 without DL assignment, indicates self-carrier, the TCI state codepoint indicated by the field "Transmission Configuration Indicator" in the DCI format is applied to the self-carrier, i.e., the carrier on which the DCI format is transmitted. The TCI state(s) indicated by the TCI state codepoint is a TCI state(s) configured and/or activated for the carrier on which the DCI is transmitted.

When the UE is configured with CrossCarrierSchedulingConfig, and if the "carrier indicator" field in a DCI format, e.g., DCI format 1_1 or DCI format 1_2 with DL assignment or DCI format 1_1 or DCI format 1_2 without DL assignment, indicates a carrier other than the self-carrier, the TCI state codepoint indicated by the field "Transmission Configuration Indicator" in the DCI format is applied to carrier indicated by the carrier indicator" field in the DCI format. The TCI state(s) indicated by the TCI state codepoint is a TCI state(s) configured and/or activated for the carrier indicated by the carrier indicator" field in the DCI format.

In one example, the DCI format (e.g., DCI format 1_1 or DCI format 1_2) with DL assignment can be configured to include "transmission configuration indication" (beam indication) field (e.g., TCI_state_id or TCI state codepoint from the codepoints activated by MAC CE). The "transmission configuration indication" field can be used to indicate the beam of its own (self) carrier (or cell or BWP), or the beam of the other carrier (or cell or BWP) according to the indicated "carrier indicator" field.

Figures 22A, 22B:
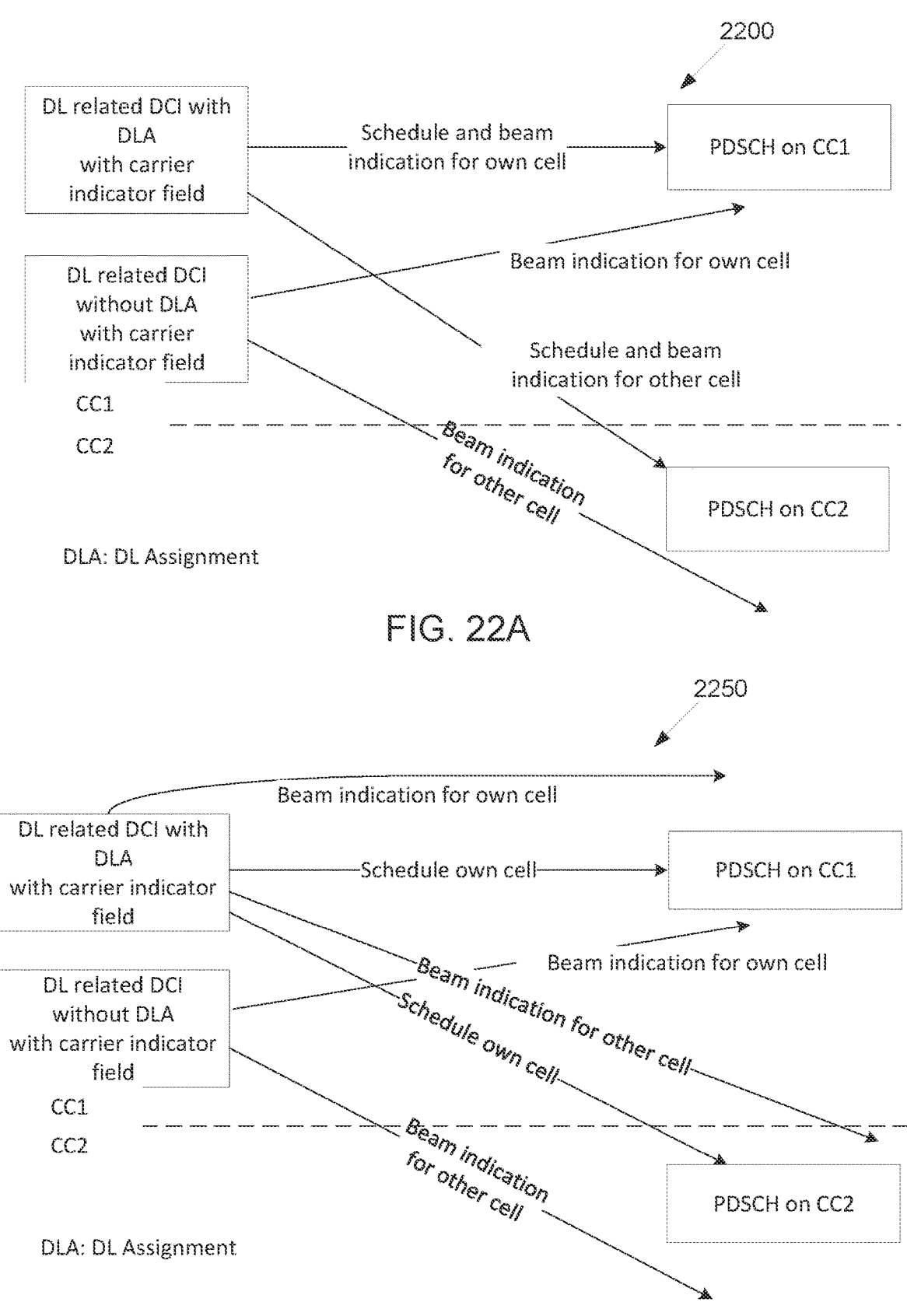
FIG. 22A illustrates yet another example of beam indication provided by a DL related DCI format according to embodiments of the present disclosure.
FIG. 22B illustrates yet another example of beam indication provided by a DL related DCI format according to embodiments of the present disclosure.

FIG. 22A illustrates yet another example of beam indication provided by a DL related DCI format 2200 according to embodiments of the present disclosure. An embodiment of the beam indication provided by a DL related DCI format 2200 shown in FIG. 22A is for illustration only.

FIG. 22B illustrates yet another example of beam indication provided by a DL related DCI format 2250 according to embodiments of the present disclosure. An embodiment of the beam indication provided by a DL related DCI format 2250 shown in FIG. 22B is for illustration only.

In FIG. 22A and FIG. 22B, the DL related DCI format with DL assignment includes a "carrier indicator" field that provides the carrier (or cell or BWP) for which the scheduling assignment and the "transmission configuration indication" (beam indication) in the DCI format is to be applied. A scheduling assignment and a "transmission configuration indication" (beam indication) can be for own (or self) carrier (or cell or BWP) or for another carrier (or cell or BWP) based on the "carrier indicator" field. The DL related DCI format without DL assignment includes a "carrier indicator" field that provides the carrier (or cell or BWP) for which the "transmission configuration indication" (beam indication) in the DCI format is to be applied. A "transmission configuration indication" (beam indication) can be for own (or self) carrier (or cell or BWP) or for another carrier (or cell or BWP) based on the "carrier indicator" field.

In FIG. 22B, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In FIG. 22A, as a variant, when the beam indication ("transmission configuration indication") is provided a DL related DCI format (e.g., DCI format 1_1 or DCI format 1_2) with a DL assignment, the beam can be applied to the PDSCH channel scheduled by the DCI format.

In another example, the DCI format (e.g., DCI format 1_1 or DCI format 1_2) with DL assignment can be configured to not include "transmission configuration indication" (beam indication) field. The DCI format only provides scheduling assignment for own (or self) carrier (or cell or BWP) or for another carrier (or cell or BWP) based on the "carrier indicator" field.

Figure 23:
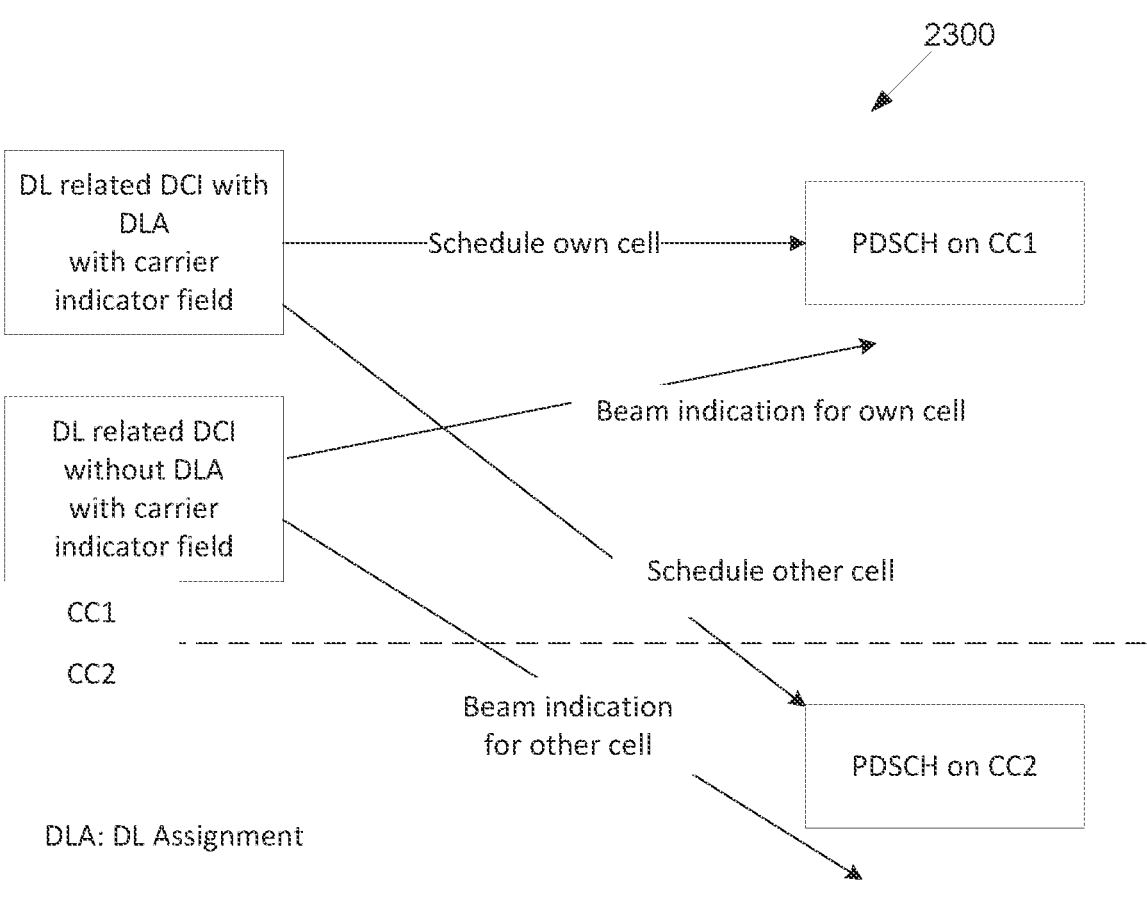
FIG. 23 illustrates an example of beam indication provided by a DCI format according to embodiments of the present disclosure.

FIG. 23 illustrates an example of beam indication provided by a DCI format 2300 according to embodiments of the present disclosure. An embodiment of the beam indication provided by a DCI format 2300 shown in FIG. 23 is for illustration only.

In FIG. 23, the DL related DCI format with DL assignment includes a "carrier indicator" field that provides the carrier (or cell or BWP) for which the scheduling assignment in the DCI format is to be applied. A scheduling assignment can be for own (or self) carrier (or cell or BWP) or for another carrier (or cell or BWP) based on the "carrier indicator" field. The DL related DCI format without DL assignment includes a "carrier indicator" field that provides the carrier (or cell or BWP) for which the "transmission configuration indication" (beam indication) in the DCI format is to be applied. A "transmission configuration indication" (beam indication) can be for own (or self) carrier (or cell or BWP) or for another carrier (or cell or BWP) based on the "carrier indicator" field.

In FIG. 23, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In one example, the UE is: (1) configured with cross carrier scheduling, e.g., there is a "carrier indicator" field in a DL related DCI format (e.g., DCI format 1_1 or DCI format 1_2) with DL assignment. The DCI format with DL assignment is used for its own (self) carrier (or cell or BPW) or other carriers (or cells or BWP) based on the "carrier indicator" field; and/or (2) configured to indicate a beam by a DL related DCI format (e.g., DCI format 1_1 or DCI format 1_2) without DL assignment for own (or self) carrier (or cell or BWP). There is no cross carrier beam indication by a DL related DCI format (e.g., DCI format 1_1 or DCI format 1_2) without DL assignment. In this case, is no "carrier indictor" field in a DL related DCI format (e.g., DCI format 1_1 or DCI format 1_2) without DL assignment.

When the UE is not configured with CrossCarrierSchedulingConfig, or if the "carrier indicator" field in a DCI format, e.g., DCI format 1_1 or DCI format 1_2 with DL assignment or DCI format 1_1 or DCI format 1_2 without DL assignment, indicates self-carrier, the TCI state codepoint indicated by the field "Transmission Configuration Indicator" in the DCI format is applied to the self-carrier, i.e., the carrier on which the DCI format is transmitted. The TCI state(s) indicated by the TCI state codepoint is a TCI state(s) configured and/or activated for the carrier on which the DCI is transmitted.

When the UE is configured with CrossCarrierScheduling-Config, and if the "carrier indicator" field in a DCI format, e.g., DCI format 1_1 or DCI format 1_2 with DL assignment or DCI format 1_1 or DCI format 1_2 without DL assignment, indicates a carrier other than the self-carrier, the TCI state codepoint indicated by the field "Transmission Configuration Indicator" in the DCI format is applied to carrier indicated by the carrier indicator" field in the DCI format. The TCI state(s) indicated by the TCI state codepoint is a TCI state(s) configured and/or activated for the carrier indicated by the carrier indicator" field in the DCI format.

In one example, the DCI format (e.g., DCI format 1_1 or DCI format 1_2) with DL assignment can be configured to include "transmission configuration indication" (beam indication) field (e.g., TCI_state_id or TCI state codepoint from the codepoints activated by MAC CE). The "transmission configuration indication" field can be used to indicate the beam of its own (self) carrier (or cell), or the beam of the other carrier or cell according to the indicated "carrier indicator" field.

FIG. 24A illustrates yet an example of beam indication provided by a DL related DCI format 2400 according to embodiments of the present disclosure. An embodiment of the beam indication provided by a DL related DCI format 2400 shown in FIG. 24A is for illustration only.

FIG. 24B illustrates yet another example of beam indication provided by a DL related DCI format 2450 according to embodiments of the present disclosure. An embodiment of the beam indication provided by a DL related DCI format 2450 shown in FIG. 24B is for illustration only.

In FIG. 24A and FIG. 24B, the DL related DCI format with DL assignment includes a "carrier indicator" field that provides the carrier (or cell or BWP) for which the scheduling assignment and the "transmission configuration indication" (beam indication) in the DCI format is to be applied. A scheduling assignment and a "transmission configuration indication" (beam indication) can be for own (or self) carrier (or cell or BWP) or for another carrier (or cell or BWP) based on the "carrier indicator" field. The DL related DCI format without DL assignment includes a "transmission configuration indication" (beam indication) in the DCI format that is applied to own (or self) carrier (or cell or BWP). For example, the DL related DCI format without DL assignment of CC1 includes beam indication for CC1, while the DL related DCI format without DL assignment of CC2 includes beam indication for CC2.

In FIG. 24A, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In FIG. 24B, as a variant, when the beam indication ("transmission configuration indication") is provided a DL related DCI format (e.g., DCI format 1_1 or DCI format 1_2) with a DL assignment, the beam can be applied to the PDSCH channel scheduled by the DCI format.

In another example, the DCI format (e.g., DCI format 1_1 or DCI format 1_2) with DL assignment can be configured to not include "transmission configuration indication" (beam indication) field. The DCI format only provides scheduling assignment for own (or self) carrier (or cell) or for another carrier (or cell) based on the "carrier indicator" field.

Figure 25:
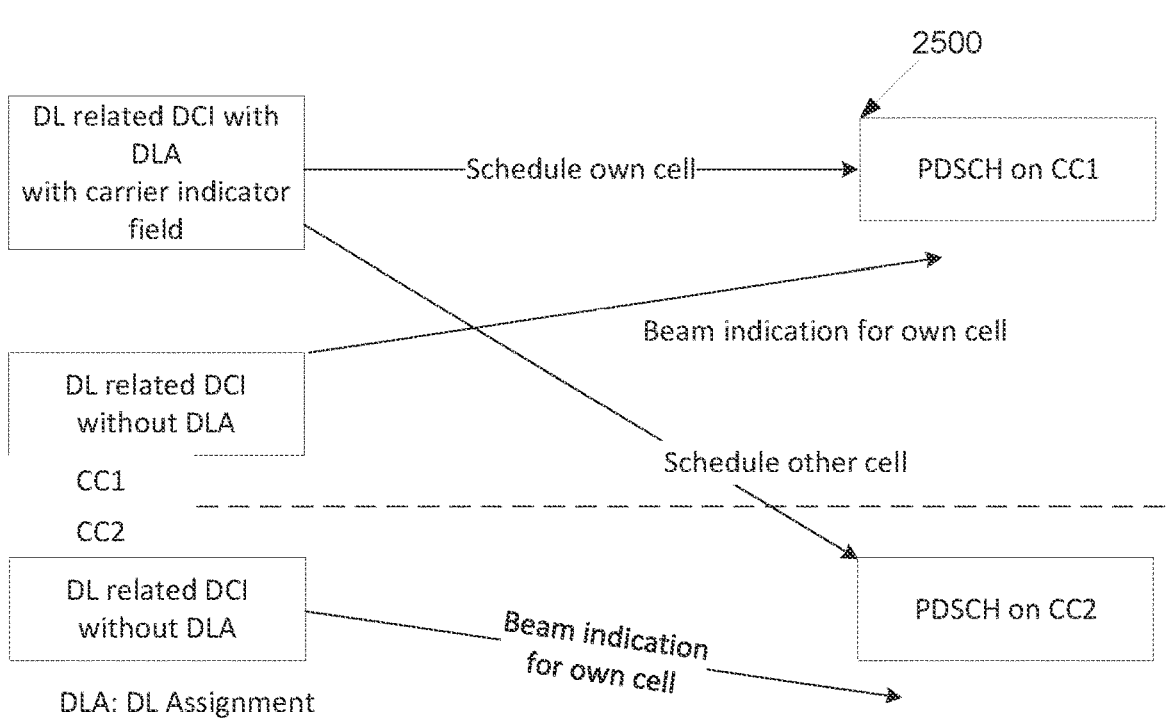
FIG. 25 illustrates an example of beam indication provided by a DCI format according to embodiments of the present disclosure.

FIG. 25 illustrates an example of beam indication provided by a DCI format 2500 according to embodiments of the present disclosure. An embodiment of the beam indication provided by a DCI format 2500 shown in FIG. 25 is for illustration only.

In FIG. 25, the DL related DCI format with DL assignment includes a "carrier indicator" field that provides the carrier (or cell or BWP) for which the scheduling assignment in the DCI format is to be applied. A scheduling assignment can be for own (or self or BWP) carrier (or cell or BWP) or for another carrier (or cell or BPW) based on the "carrier indicator" field. The DL related DCI format without DL assignment includes a "transmission configuration indication" (beam indication) in the DCI format that is applied to own (or self) carrier (or cell or BPW). For example, the DL related DCI format without DL assignment of CC1 includes beam indication for CC1, while the DL related DCI format without DL assignment of CC2 includes beam indication for CC2.

In FIG. 25, a beam indication ("transmission configuration indication") provided by a DCI format is applied after a beam application time, wherein the beam application time can be from a channel providing an acknowledgment of the reception of the DCI format. Alternatively, a beam application time is from a PDCCH providing the DCI format.

In one example, a beam indication applies to a list of component carriers. The "transmission configuration indication" field is included in a DCI format. The DCI format includes a "carrier indicator" field. The "carrier indicator" field points to a carrier in a list of carriers configured by higher layer (e.g., RRC) signaling to follow a same TCI state or TCI state ID. The "transmission configuration indication" is applied to the list of carriers.

Figure 26:
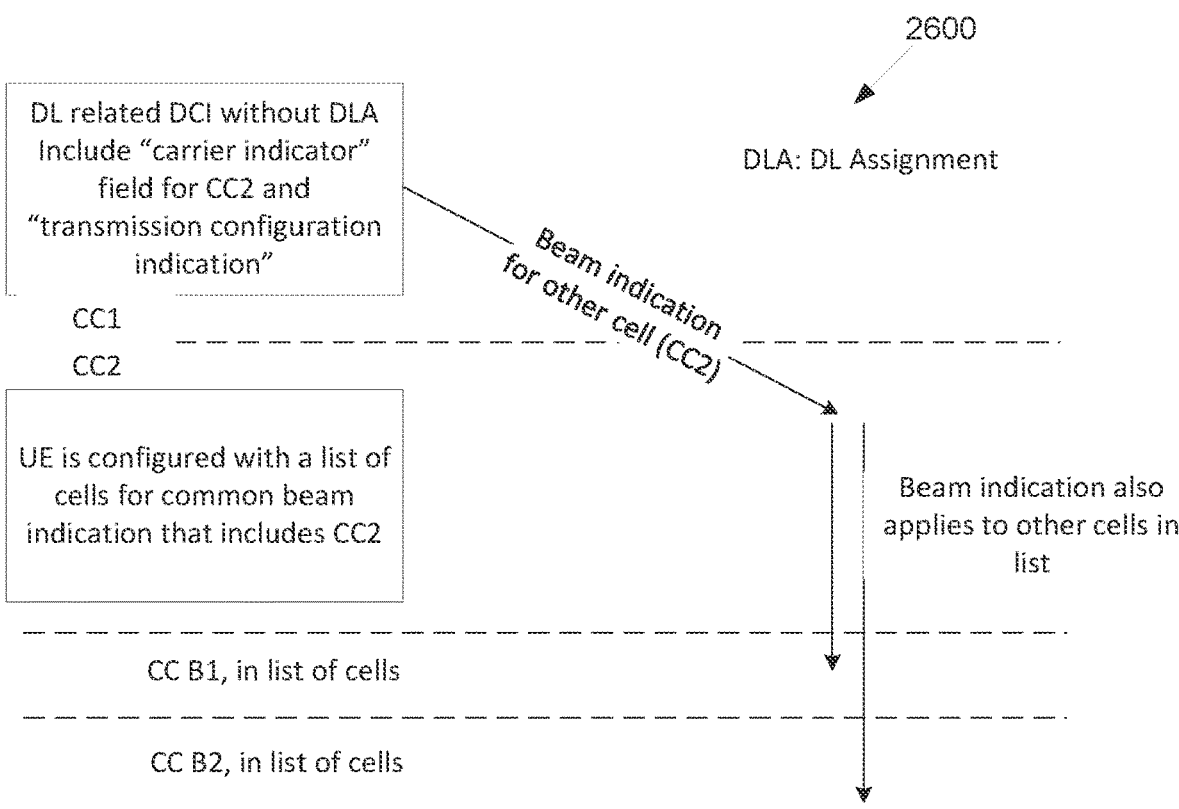
FIG. 26 illustrates an example of UE configuration with cross-beam indication using a DCI format according to embodiments of the present disclosure.

FIG. 26 illustrates an example of UE configuration with cross-beam indication using a DCI format 2600 according to embodiments of the present disclosure. An embodiment of the UE configuration with cross-beam indication using a DCI format 2600 shown in FIG. 26 is for illustration only.

In FIG. 26, the UE is configured with cross-carrier beam indication using DCI format without DL assignment for beam indication. The UE is further configured with a list of carriers for beam common beam indication, wherein the "transmission configuration indication" field in a DCI format determines the TCI state or TCI state ID for the carriers in the list. The UE receives a DL related DCI format (e.g., DCI format 1_1 or DCI format 1_2) without a DL assignment on CC1. The DCI format includes: (1) a "carrier indictor" field pointing to another carrier (e.g., CC2); and (2) a "transmission configuration indication" field for beam indication.

The configured list of carriers (or cells or BWPs) that follow the same TCI state or TCI state ID includes CC2 (which is indicated by the "carrier indicator" field"). The UE applies the beam indication ("transmission configuration indication") provided by a DCI format after a beam application time to the carriers (or cells or BWPs) in the list including CC2. The beam application time can be from a channel providing an acknowledgment of the reception of the DCI format. Alternatively, the beam application time is from a PDCCH providing the DCI format.

Figure 27:
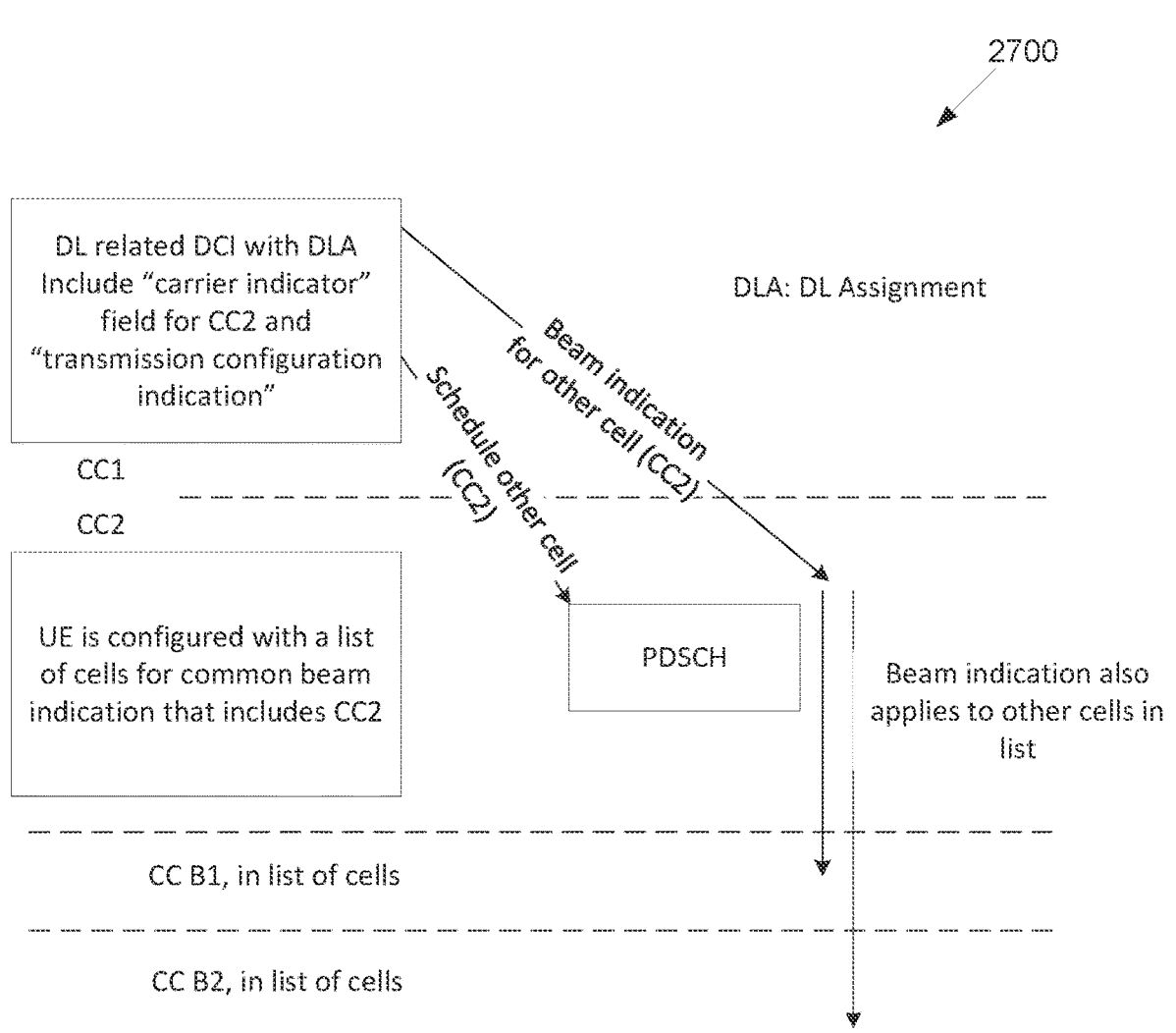
FIG. 27 illustrates an example of UE configuration with cross-carrier scheduling and cross-carrier beam indication using a DCI format according to embodiments of the present disclosure.

FIG. 27 illustrates an example of UE configuration with cross-carrier scheduling and cross-carrier beam indication using a DCI format 2700 according to embodiments of the present disclosure. An embodiment of the UE configuration with cross-carrier scheduling and cross-carrier beam indication using a DCI format 2700 shown in FIG. 27 is for illustration only.

In FIG. 27, the UE is configured with cross-carrier scheduling and cross-carrier beam indication using DCI format with DL assignment for beam indication. The UE is further configured with a list of carriers for beam common beam indication, wherein the "transmission configuration indication" field in a DCI format determines the TCI state or TCI state ID for the carriers in the list. The UE receives a DL related DCI format (e.g., DCI format 1_1 or DCI format 1_2) with a DL assignment on CC1. The DCI format includes: (1) a "carrier indictor" field pointing to another carrier (e.g., CC2); (2) a "transmission configuration indication" field for beam indication; and (3) DL scheduling assignment, which applies to carrier indicated by the "carrier indicator" field (e.g., CC2).

The configured list of carriers (or cells or BWPs) that follow the same TCI state or TCI state ID includes CC2 (which is indicated by the "carrier indicator" field"). The UE applies the beam indication ("transmission configuration indication") provided by a DCI format after a beam application time to the carriers (or cells or BWPs) in the list including CC2. The beam application time can be from a channel providing an acknowledgment of the reception of the DCI format. Alternatively, the beam application time is from a PDCCH providing the DCI format.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive configuration information for a list of transmission configuration indicator (TCI) states,
receive configuration information for a list of TCI state code points,
receive configuration information for cross carrier scheduling, and
receive a downlink control information (DCI) format including (i) a carrier indicator field associated with the configuration information for cross carrier scheduling and (ii) a transmission configuration indication field indicating a TCI state code point from the list of TCI state code points; and
a processor operably coupled to the transceiver, the processor configured to apply the indicated TCI state code point to a carrier indicated by the carrier indicator field,
wherein the transceiver is further configured to receive or transmit downlink (DL) channels or uplink (UL) channels, respectively, based on quasi-co-location properties or spatial properties corresponding to the indicated TCI state code point,
wherein the processor is further configured to apply the indicated TCI state code point after a configured time from a last symbol of a channel conveying hybrid automatic repeat request acknowledgement (HARQ-ACK) feedback corresponding to the DCI format, and
wherein the configured time depends on:
a carrier with a smallest sub-carrier spacing among a carrier on which the DCI format was received and the carrier indicated by the DCI format, or a carrier with a smallest sub-carrier spacing among a carrier on which the DCI format was received and the list of component carriers that use the indicated TCI state code point.

2. The UE of claim 1, wherein:

the transceiver is further configured to receive a list of component carriers that corresponds to a same TCI state identifier (ID), the indicated carrier is included in the list of component carriers, and the processor is further configured to apply the indicated TCI state code point to all carriers in the list of components carriers.

3. The UE of claim 1, wherein the TCI state code point indicates:

a DL TCI state, an UL TCI state, a joint TCI state, or a pair of DL and UL TCI states.

4. The UE of claim 1, wherein the DCI format is DCI Format 1_1 or DCI Format 1_2 carrying the TCI state code point with a DL assignment.

5. The UE of claim 1, wherein the DCI format is DCI Format 1_1 or DCI Format 1_2 carrying the TCI state code point without a DL assignment.

6. A base station (BS), comprising:

a transceiver configured to:

transmit configuration information for a list of transmission configuration indicator (TCI) states, transmit configuration information for a list of TCI state code points, transmit configuration information for cross carrier scheduling, and transmit a downlink control information (DCI) format including (i) a carrier indicator field associated with the configuration information for cross carrier scheduling and (ii) a transmission configuration indication field indicating a TCI state code point from the list of TCI state code points; and a processor operably coupled to the transceiver, the processor configured to apply the indicated TCI state code point to a carrier indicated by the carrier indicator field, wherein the transceiver is further configured to transmit or receive downlink (DL) channels or uplink (UL) channels, respectively, based on quasi-co-location properties or spatial properties corresponding to the indicated TCI state code point, wherein the processor is further configured to apply the indicated TCI state code point after a configured time from a last symbol of a channel conveying hybrid automatic repeat request acknowledgement (HARQ-ACK) feedback corresponding to the DCI format, and wherein the configured time depends on:

a carrier with a smallest sub-carrier spacing among a carrier on which the DCI format was transmitted and the carrier indicated by the DCI format, or a carrier with a smallest sub-carrier spacing among a carrier on which the DCI format was transmitted and the list of component carriers that use the indicated TCI state code point.

7. The BS of claim 6, wherein:

the transceiver is further configured to transmit a list of component carriers that corresponds to a same TCI state identifier (ID), the indicated carrier is included in the list of component carriers, and the processor is further configured to apply the indicated TCI state code point to all carriers in the list of components carriers.

8. The BS of claim 6, wherein the TCI state code point indicates:

a DL TCI state, an UL TCI state, a joint TCI state, or a pair of DL and UL TCI states.

9. The BS of claim 6, wherein the DCI format is DCI Format 1_1 or DCI Format 1_2 carrying the TCI state code point with a DL assignment.

10. The BS of claim 6, wherein the DCI format is DCI Format 1_1 or DCI Format 1_2 carrying the TCI state code point without a DL assignment.

11. A method of operating a user equipment (UE), the method comprising:

receiving configuration information for a list of transmission configuration indicator (TCI) states;

receiving configuration information for a list of TCI state code points;

receiving configuration information for cross carrier scheduling;

receiving a downlink control information (DCI) format including (i) a carrier indicator field associated with the configuration information for cross carrier scheduling and (ii) a transmission configuration indication field indicating a TCI state code point from the list of TCI state code points;

applying the indicated TCI state code point to a carrier indicated by the carrier indicator field;

receiving or transmitting downlink (DL) channels or uplink (UL) channels, respectively, based on quasi-co-location properties or spatial properties corresponding to the indicated TCI state code point; and applying the indicated TCI state code point after a configured time from a last symbol of a channel conveying hybrid automatic repeat request acknowledgement (HARQ-ACK) feedback corresponding to the DCI format, wherein the configured time depends on:

a carrier with a smallest sub-carrier spacing among a carrier on which the DCI format was received and the carrier indicated by the DCI format, or a carrier with a smallest sub-carrier spacing among a carrier on which the DCI format was received and the list of component carriers that use the indicated TCI state code point.

12. The method of claim 11, further comprising:

receiving a list of component carriers that corresponds to a same TCI state identifier (ID), wherein the indicated carrier is included in the list of component carriers, and applying the indicated TCI state code point to all carriers in the list of components carriers.

13. The method of claim 11, wherein the TCI state code point indicates:

a DL TCI state, an UL TCI state, a joint TCI state, or a pair of DL and UL TCI states.

14. The method of claim 11, wherein:

the DCI format is DCI Format 1_1 or DCI Format 1_2 carrying the TCI state code point with a DL assignment, or the DCI format is DCI Format 1_1 or DCI Format 1_2 carrying the TCI state code point without a DL assignment.

\* \* \* \* \*